US012761133B2

(12) United States Patent
Saleh et al.

(10) Patent No.: US 12,761,133 B2
(45) Date of Patent: Oct. 13, 2026

(54) SYSTEMS AND METHODS OF PARTICLE IDENTIFICATION IN SOLUTION

(71) Applicant: The Board of Trustees of the Leland Stanford Junior University, Stanford, CA (US)

(72) Inventors: Amr A. E. Saleh, Stanford, CA (US); Jennifer A. Dionne, Menlo Park, CA (US); Butrus T. Khuri-Yakub, Palo Alto, CA (US); Niaz Banaei, San Francisco, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 492 days.

(21) Appl. No.: 17/755,204

(22) PCT Filed: Oct. 15, 2020

(86) PCT No.: PCT/US2020/055755
§ 371 (c)(1),
(2) Date: Apr. 22, 2022

(87) PCT Pub. No.: WO2021/080845
PCT Pub. Date: Apr. 29, 2021

(65) Prior Publication Data

US 2022/0390351 A1 Dec. 8, 2022

Related U.S. Application Data

(60) Provisional application No. 62/926,271, filed on Oct. 25, 2019.

(51) Int. Cl.
*G01N 15/1433* (2024.01)
*G01N 21/65* (2006.01)

(52) U.S. Cl.
CPC ....... *G01N 15/1433* (2024.01); *G01N 21/658* (2013.01)

(58) Field of Classification Search
CPC ......................... G01N 15/1433; G01N 21/658
See application file for complete search history.

(56) References Cited

U.S. PATENT DOCUMENTS 5,573,927 A 11/1996 Nelson
7,518,728 B2 * 4/2009 Koo .......................... G01J 3/44 356/456

(Continued)

FOREIGN PATENT DOCUMENTS

CN 114868011 A 8/2022
EP 3136270 A1 3/2017

(Continued)

OTHER PUBLICATIONS

Li, Jia, Fabrice Rossignol, and Joanne Macdonald. "Inkjet printing for biosensor fabrication: combining chemistry and technology for advanced manufacturing." Lab on a Chip 15.12 (2015): 2538-2558. (Year: 2015).*

(Continued)

*Primary Examiner* — John Villecco
*Assistant Examiner* — Alexander John Rodgers
(74) *Attorney, Agent, or Firm* — KPPB LLP

(57) ABSTRACT

Methods to detect contaminants in a solution and applications thereof are described. Generally, solutions are printed onto a substrate and then imaged via Raman spectroscopy, which can be utilized to detect signals derived from contaminants.

18 Claims, 19 Drawing Sheets

(56) References Cited

U.S. PATENT DOCUMENTS

| | | | | |
|---|---|---|---|---|
| 9,072,428 | B2 | 7/2015 | Bigio et al. | |
| 9,134,247 | B2 | 9/2015 | Sengupta et al. | |
| 9,518,986 | B2 * | 12/2016 | Blackburn | G01N 33/56905 |
| 9,897,598 | B2 * | 2/2018 | Lakowicz | G01N 21/648 |
| 10,166,280 | B2 * | 1/2019 | Tam | C07K 14/32 |
| 10,593,039 | B2 | 3/2020 | Jalali et al. | |
| 2007/0076208 | A1 * | 4/2007 | Koo | G01J 3/44 356/451 |
| 2010/0056928 | A1 | 3/2010 | Zuzak et al. | |
| 2010/0067000 | A1 * | 3/2010 | Baumberg | G01N 21/658 356/301 |
| 2010/0188496 | A1 | 7/2010 | Xie et al. | |
| 2011/0109902 | A1 * | 5/2011 | Lin | G01N 21/658 422/68.1 |
| 2013/0130939 | A1 * | 5/2013 | Wawro | G01N 27/04 506/18 |
| 2013/0221222 | A1 | 8/2013 | Baiz et al. | |
| 2014/0012224 | A1 * | 1/2014 | Zhang | H01L 29/0665 604/501 |
| 2015/0038347 | A1 | 2/2015 | Johnson et al. | |
| 2015/0168305 | A1 | 6/2015 | Edel et al. | |
| 2016/0003747 | A1 * | 1/2016 | Farquharson | G01N 21/658 435/287.9 |
| 2017/0234817 | A1 * | 8/2017 | Bischof | G01N 21/8483 435/7.1 |
| 2019/0265166 | A1 | 8/2019 | Neumann et al. | |
| 2020/0088573 | A1 | 3/2020 | Goldring et al. | |
| 2020/0209144 | A1 * | 7/2020 | Pan | G01N 33/82 |
| 2021/0028215 | A1 | 1/2021 | Devlin et al. | |
| 2022/0397531 | A1 | 12/2022 | Angel et al. | |
| 2023/0141082 | A1 * | 5/2023 | Vörös | G01N 21/45 356/300 |
| 2024/0175752 | A1 | 5/2024 | Dionne et al. | |

FOREIGN PATENT DOCUMENTS

| | | | | |
|---|---|---|---|---|
| EP | 4049007 | A1 | 8/2022 | |
| WO | WO-2006076040 | A2 * | 7/2006 | C23C 14/042 |
| WO | 2015110600 | A1 | 7/2015 | |
| WO | 2021080845 | A1 | 4/2021 | |
| WO | 2022213092 | A1 | 10/2022 | |

OTHER PUBLICATIONS

B. Hadimioglu et al., "Acoustic ink printing," IEEE 1992 Ultrasonics Symposium Proceedings, Tucson, AZ, USA, 1992, pp. 929-935 vol.2, doi: 10.1109/ULTSYM.1992.275823. (Year: 1992).*

C. Chen, J. Ye, Y. Li, L. Lagae, T. Stakenborg and P. Van Dorpe, "Detection of DNA Bases and Oligonucleotides in Plasmonic Nanoslits Using Fluidic SERS," in IEEE Journal of Selected Topics in Quantum Electronics, vol. 19, No. 3, pp. 4600707-4600707, May-Jun. 2013, (Year: 2013).*

Spectroscopy of Single Hemoglobin Molecules by Surface Enhanced Raman Scattering Hongxing Xu, Erik J. Bjerneld, Mikael KII, and Lars Barjesson Department of Applied Physics, Chalmers University of Technology, S-412 96 Gateborg, Sweden (Year: 1999).*

Tabakhi et al., "An unsupervised feature selection algorithm based on ant colony optimization", Engineering Applications of Artificial Intelligence, Jun. 2014, vol. 32, pp. 112-123, doi: 10.1016/j.engappai.2014.03.007.

Dorigo et al., "Ant Colony System: A Cooperative Learning Approach to the Traveling Salesman Problem", IEEE Transactions on Evolutionary Computation, Apr. 1997, vol. 1, No. 1, pp. 53-66.

Efitorov et al., "Significant Feature Selection in Neural Network Solution of an Inverse Problem in Spectroscopy", Procedia Computer Science, vol. 66, pp. 93-102, 2015, doi: 10.1016/j.procs.2015.11.012.

Gevrey et al., "Review and comparison of methods to study the contribution of variables in artificial neural network models", Ecological Modelling, Feb. 15, 2003, vol. 160, Issue 3, pp. 249-264, https://doi.org/10.1016/S0304- 3800(02)00257-0.

Ho et al., "Rapid Identification of Pathogenic Bacteria Using Raman Spectroscopy and Deep Learning", Nature Communications, 2019, vol. 10, No. 4927, pp. 1-8, DOI: 10.1038/s41467-019-12898-9.

Li et al., "Identification and characterization of colorectal cancer using Raman spectroscopy and feature selection techniques", Optics Express, Oct. 14, 2014, vol. 22, No. 21, 25895-25908, doi: 10.1364/OE.22.025895.

Li et al., "Inkjet printing for biosensor fabrication: combining chemistry and technology for advanced manufacturing", The Royal Society of Chemistry, 2013. [retrieved on 14.01.2021]. < URL: https://pubs.rsc.org/en/content/getauthorversionpdf/C5LC00235D>.

International Preliminary Report on Patentability for International Application PCT/US2020/055755, Report issued Apr. 26, 2022, Mailed on May 5, 2022, 13 Pgs.

International Preliminary Report on Patentability for International Application No. PCT/US2022/071446, Report issued Oct. 3, 2023, Mailed Oct. 12, 2023, 06 Pgs.

International Search Report and Written Opinion for International Application No. PCT/US2020/055755, Search completed Jan. 16, 2021, Mailed Feb. 9, 2021, 19 Pgs.

International Search Report and Written Opinion for International Application No. PCT/US2022/071446, Search completed Jul. 16, 2022, Mailed Aug. 9, 2022, 14 Pgs.

"Chi-Square Statistic: How to Calculate It—Distribution", https://www.statisticshowto.com/probability-andstatistics/chi-square/, 13 pgs.

"F-Test", https://www.statisticshowto.com/probability-andstatistics/hypothesis-testing/f-test/, 8 pgs.

"Sklearn Mutual Information Classification", https://scikit-learn.org/stable/modules/generated/sklearnfeature_selectionmutual_info_classif.html, 4 pgs.

"Guidelines for the Management of Adults with Hospital-acquired, Ventilator-associated, and Healthcare-associated Pneumonia", American Thoracic Society. & Infectious Diseases Society of America, American Journal of Respiratory and Critical Care Medicine, vol. 171, No. 4, 2005, pp. 388-416, doi: 10.1164/rccm.200405-644ST.

Ayala et al., "Drug-resistant *Staphylococcus aureus* strains reveal distinct biochemical features with Raman microspectroscopy", ACS Infectious Diseases, vol. 4, No. 8, May 30, 2018, pp. 1197-1210, doi: 10.1021/acsinfecdis.8b00029.

Banaei et al., "SUH Antibiogram Data for Bacterial and Yeast Isolates", Stanford Healthcare Clinical Microbiology Laboratory, 2016, 2 pgs.

Berisha et al., "Deep learning for FTIR histology: leveraging spatial and spectral features with convolutional neural networks", Analyst, vol. 144, No. 5, Dec. 2018, pp. 1642-1653, doi: 10.1039/c8an01495g.

Boardman et al., "Rapid Detection of Bacteria from Blood with Surface-Enhanced Raman Spectroscopy", Analytical Chemistry, vol. 88, No. 16, Jul. 18, 2016, pp. 8026-8035, doi: 10.1021/acs.analchem.6b01273.

Butler et al., "Using Raman spectroscopy to characterize biological materials", Nature Protocols, vol. 11, No. 4, Mar. 10, 2016, pp. 664-687, doi: 10.1038/nprot.2016.036.

Chaudhuri et al., "EFNS guideline on the management of community-acquired bacterial meningitis: report of an EFNS Task Force on acute bacterial meningitis in older children and adults", European Journal of Neurology, vol. 15, No. 7, Jun. 10, 2008, pp. 649-659, doi: 10.1111/j.1468-1331.2008.02193.x.

Chen et al., "Surface enhanced Raman spectroscopy of Chlamydia trachomatis and Neisseria gonorrhoeae for diagnostics, and extra-cellular metabolomics and biochemical monitoring", Scientific Reports, vol. 8, No. 5163, Mar. 26, 2018, 12 pgs., doi: 10.1038/s41598-018-23562-5.

Chung et al., "Fast and continuous microorganism detection using aptamer-conjugated fluorescent nanoparticles on an optofluidic platform", Biosensors and Bioelectronics, vol. 67, May 15, 2015, pp. 303-308, doi: 10.1016/j.bios.2014.08.039.

Cronquist et al., "Impacts of Culture-Independent Diagnostic Practices on Public Health Surveillance for Bacterial Enteric Pathogens", Clinical Infectious Diseases, vol. 54, No. Suppl 5, Jun. 1, 2012, pp. S432-S439, doi: 10.1093/cid/cis267.

(56) References Cited

OTHER PUBLICATIONS

Deantonio et al., "Epidemiology of community-acquired pneumonia and implications for vaccination of children living in developing and newly industrialized countries: A systematic literature review", Human Vaccines & Immunotherapeutics, vol. 12, No. 9, 2016, pp. 2422-2440, doi: 10.1080/21645515.2016.1174356.
Dellinger et al., "Surviving Sepsis Campaign: International Guidelines for Management of Severe Sepsis and Septic Shock: 2012", Critical Care Medicine, vol. 41, No. 2, Feb. 2013, pp. 580-637, doi: 10.1097/CCM.0b013e31827e83af.
Diep et al., "The Arginine Catabolic Mobile Element and Staphylococcal Chromosomal Cassette mec Linkage: Convergence of Virulence and Resistance in the USA300 Clone of Methicillin-Resistant *Staphylococcus aureus*", The Journal of Infectious Diseases, vol. 197, No. 11, Jun. 1, 2008, pp. 1523-1530, doi: 10.1086/587907.
Dong et al., "Learning a Deep Convolutional Network for Image Super-Resolution", Computer Vision—ECCV, Springer, vol. 8692, Part IV, 2014, pp. 184-199, doi: 10.1007/978-3-319-10593-2_13.
Dumoulin et al., "A guide to convolution arithmetic for deep learning", arXiv:1603.07285v2 [stat.ML], Jan. 11, 2018, 31 pgs.
Fleischmann et al., "Assessment of Global Incidence and Mortality of Hospital-treated Sepsis. Current Estimates and Limitations", American Journal of Respiratory and Critical Care Medicine, vol. 193, No. 3, Feb. 1, 2016, pp. 259-272, doi: 10.1164/rccm.201504-0781OC.
Fleming-Dutra et al., "Prevalence of Inappropriate Antibiotic Prescriptions Among US Ambulatory Care Visits, 2010-2011", Journal of the American Medical Association, vol. 315, No. 17, May 3, 2016, pp. 1864-1873, doi: 10.1001/jama.2016.4151.
Germond et al., "Raman spectral signature reflects transcriptomic features of antibiotic resistance in *Escherichia coli*", Communications Biology, vol. 1, No. 85, Jul. 2, 2018, 10 pgs., doi: 10.1038/s42003-018-0093-8.
Gimler, "Beauty Meets Bacteria", Suffolk University, Boston, Published on Feb. 25, 2019, Retrieved from internet <https://www.suffolk.edu/news-features/news/2019/2019/02/26/33/beauty-meets-bacteria>, retrieved on Aug. 19, 2025, 4 pgs.
Girshick et al., "Rich feature hierarchies for accurate object detection and semantic segmentation", Proceedings of the IEEE Conference on Computer Vision and Pattern Recognition, Jun. 2014, pp. 580-587, doi: 10.1109/CVPR.2014.81.
Guo et al., "Model transfer for Raman-spectroscopy-based bacterial classification", Journal of Raman Spectroscopy, vol. 49, No. 4, Feb. 14, 2018, pp. 627-637, doi: 10.1002/jrs.5343.
Gurbani et al., "A convolutional neural network to filter artifacts in spectroscopic MRI", Magnetic Resonance in Medicine, vol. 80, No. 5, Mar. 9, 2018, pp. 1765-1775, doi: 10.1002/mrm.27166.
He et al., "Deep Residual Learning for Image Recognition", Proceedings of the IEEE Conference on Computer Vision and Pattern Recognition, 2016, pp. 770-778, doi: 10.1109/CVPR.2016.90.
Kampe et al., "Recursive feature elimination in Raman spectra with support vector machines", Frontiers of Optoelectronics, vol. 10, Jul. 2017, pp. 273-279, doi: 10.1007/s12200-017-0726-4.
Kang et al., "Rapid detection of single bacteria in unprocessed blood using Integrated Comprehensive Droplet Digital Detection", Nature Communications, vol. 5, No. 5427, Nov. 13, 2014, 10 pgs., doi: 10.1038/ncomms6427.
Karpathy et al., "Deep Visual-Semantic Alignments for Generating Image Descriptions", Proceedings of the IEEE Conference on Computer Vision and Pattern Recognition, 2015, pp. 3128-3137.
Kingma et al., "Adam: A Method for Stochastic Optimization", International Conference on Learning Representations (ICLR), 2015, arXiv:1412.6980v9 [cs.LG], Jan. 30, 2017, 15 pgs.
Kirchhoff et al., "Simple ciprofloxacin resistance test and determination of minimal inhibitory concentration (MIC) within two hours using Raman spectroscopy", Analytical Chemistry, vol. 90, No. 3, Dec. 20, 2017, pp. 1811-1818, doi: 10.1021/acs.analchem.7b03800.
Kloss et al., "Culture Independent Raman Spectroscopic Identification of Urinary Tract Infection Pathogens: A Proof of Principle Study", Analytical Chemistry, vol. 85, No. 20, Sep. 6, 2013, pp. 9610-9616, doi: 10.1021/ac401806f.
Kögler et al., "Bare laser-synthesized Au-based nanoparticles as nondisturbing surface-enhanced Raman scattering probes for bacteria identification", Journal of Biophotonics, vol. 11, No. 7, Feb. 2018, 10 pgs., doi: 10.1002/jbio.201700225.
Krauß et al., "Hierarchical deep convolutional neural networks combine spectral and spatial information for highly accurate Raman-microscopy-based cytopathology", Journal of BioPhotonics, vol. 11, No. 10, Article e201800022, May 2018, pp. 1-10, doi: 10.1002/jbio.201800022.
Krizhevsky et al., "ImageNet Classification with Deep Convolutional Neural Networks", Advances in Neural Information Processing Systems (Curran Associates, Inc.), vol. 25, 2012, pp. 1097-1105.
Lamy et al., "How to Optimize the Use of Blood Cultures for the Diagnosis of Bloodstream Infections? A State-of-the Art", Frontiers in Microbiology, vol. 7, No. 697, May 12, 2016, 13 pgs., doi: 10.3389/fmicb.2016.00697.
Li et al., "Shell-isolated nanoparticle-enhanced Raman spectroscopy", Nature, vol. 464, Mar. 18, 2010, pp. 392-395, doi: 10.1038/nature08907.
Liu et al., "Deep Convolutional Neural Networks for Raman Spectrum Recognition : A Unified Solution", Analyst, vol. 142, No. 21, Aug. 2017, pp. 4067-4074, doi: 10.1039/c7an01371j.
Liu et al., "Rapid bacterial antibiotic susceptibility test based on simple surface-enhanced Raman spectroscopic biomarkers", Scientific Reports, vol. 6, No. 23375, Mar. 21, 2016, 15 pgs., doi: 10.1038/srep23375.
Lotfollahi et al., "Digital Staining of High-Definition Fourier Transform Infrared (FT-IR) Images Using Deep Learning", Applied Spectroscopy, vol. 73, No. 5, 2019, pp. 556-564, doi: 10.1177/0003702818819857.
Lu et al., "Detecting and Tracking Nosocomial Methicillin-Resistant *Staphylococcus aureus* Using a Microfluidic SERS Biosensor", Analytical Chemistry, vol. 85, No. 4, Jan. 18, 2013, pp. 2320-2327, doi: 10.1021/ac303279u.
Malek et al., "One-dimensional convolutional neural networks for spectroscopic signal regression", Journal of Chemometrics, vol. 32, No. 5, Article e2977, Nov. 27, 2017, pp. 1-17, doi: 10.1002/cem.2977.
Mnih et al., "Recurrent Models of Visual Attention", Advances in Neural Information Processing Systems (Curran Associates, Inc.), vol. 27, 2014, pp. 2204-2212.
Münchberg et al., "Raman spectroscopic identification of single bacterial cells under antibiotic influence", Analytical and Bioanalytical Chemistry, vol. 406, Mar. 21, 2014, pp. 3041-3050, doi: 10.1007/s00216-014-7747-2.
Novelli-Rousseau et al., "Culture-free Antibiotic-susceptibility Determination From Single-bacterium Raman Spectra", Scientific Reports, vol. 8, No. 3957, Mar. 2, 2018, 12 pgs., doi: 10.1038/s41598-018-22392-9.
Pallen et al., "High-throughput sequencing and clinical microbiology: progress, opportunities and challenges", Current Opinion in Microbiology, vol. 13, No. 5, Oct. 2010, pp. 625-631, doi: 10.1016/j.mib.2010.08.003.
Reimer et al., "Update on Detection of Bacteremia and Fungemia", Clinical Microbiology Reviews, vol. 10, No. 3, Jul. 1997, pp. 444-465, doi: 10.1128/CMR.10.3.444.
Schmid et al., "Gaussian mixture discriminant analysis for the single-cell differentiation of bacteria using micro-raman spectroscopy", Chemometrics and Intelligent Laboratory Systems, vol. 96, No. 2, Apr. 15, 2009, pp. 159-171, doi: 10.1016/j.chemolab.2009.01.008.
Stöckel et al., "The application of Raman spectroscopy for the detection and identification of microorganisms", Journal of Raman Spectroscopy, vol. 47, 2016, pp. 89-109, doi: 10.1002/jrs.4844.
Torio et al., "National Inpatient Hospital Costs: The Most Expensive Conditions by Payer, 2013", Agency for Healthcare Research and Quality (US), Statistical Brief #204, May 2016, 15 pgs.
Tung et al., "Batch effects and the effective design of single-cell gene expression studies", Scientific Reports, vol. 7, No. 39921, Jan. 3, 2017, 15 pgs., doi: 10.1038/srep39921.

(56) References Cited

OTHER PUBLICATIONS

Vincent et al., "International Study of the Prevalence and Outcomes of Infection in Intensive Care Units", Journal of the American Medical Association, vol. 302, No. 21, 2009, pp. 2323-2329, doi: 10.1001/jama.2009.1754.
Wang et al., "Advances and Applications of Single-Cell Sequencing Technologies", Molecular Cell, vol. 58, No. 4, May 21, 2015, pp. 598-609, doi: 10.1016/j.molcel.2015.05.005.
Wang et al., "Visual Tracking with Fully Convolutional Networks", Proceedings of the IEEE International Conference on Computer Vision (ICCV), 2015, pp. 3119-3127, doi: 10.1109/ICCV.2015.357.
Zhang et al., "Colorful Image Colorization", Computer Vision—ECCV, Part III, 2016, pp. 649-666, doi: 10.1007/978-3-319-46487-9-40.
Zhang et al., "DeepSpectra: An end-to-end deep learning approach for quantitative spectral analysis", Analytica Chimica Acta, vol. 1058, Jun. 13, 2019, pp. 48-57, doi: 10.1016/j.aca.2019.01.002.
Caldwell et al., "Plasmonic Nanopillar Arrays for Large-Area, High-Enhancement Surface-Enhanced Raman Scattering Sensors", ACS Nano, vol. 5, No. 5, Apr. 11, 2011, pp. 4046-4055, doi: 10.1021/nn200636t.

* cited by examiner

SYSTEMS AND METHODS OF PARTICLE IDENTIFICATION IN SOLUTION

CROSS-REFERENCE TO RELATED APPLICATIONS

The current application is a national stage of PCT Patent Application No. PCT/US2020/055755, entitled "Systems and Methods of Particle Identification in Solution" to Saleh et al., filed Oct. 15, 2020, which claims the benefit of and priority under 35 U.S.C. § 119(e) to U.S. Provisional Patent Application No. 62/926,271 entitled "Systems and Methods of Particle Identification in Solution" to Saleh et al., filed Oct. 25, 2019, the disclosures of which are hereby incorporated by reference in their entireties.

FIELD OF THE INVENTION

The present invention generally relates to systems and methods of particle identification in solution; and more particularly to systems and methods that incorporate optical spectroscopy to identify particle in solution.

BACKGROUND

Raman spectroscopy is a technique that utilizes light to determine vibrational modes of molecules. Based on vibrational modes detected, a structural fingerprint can be produced, each unique to molecules imaged. Raman spectroscopy offers several advantages for microscopic analysis. Since it is a light scattering technique, specimens do not need to be fixed or sectioned. Raman spectra can be collected from a very small volume (<1 μm in diameter, <10 μm in depth); these spectra allow the identification of species present in that volume. Water does not generally interfere with Raman spectral analysis. Thus, Raman spectroscopy is suitable for the microscopic examination of minerals, polymers, biological cells, and biomolecules.

Rapid, accurate identification of bacterial infection and antibiotic susceptibility testing is essential to improve patient prognosis, slow the spread of infectious diseases, contain epidemics, and mitigate the misuse of antibiotics. This is particularly true for bacterial bloodstream infections (BSIs), which impact tens of millions of patients around the world each year and lead to more deaths than AIDS, breast cancer, and prostate cancer combined. There is need to develop bacterial bloodstream infections detection methods with improved speed, sensitivity, and specificity.

BRIEF SUMMARY

Systems and methods in accordance with various embodiments of the invention enable particle identification in solution. Many embodiments provide a method to incorporate optical spectroscopy to identify particles in solution. In many embodiments, contamination of an environmental sample can be detected. In some embodiments, environmental samples (in solution or diluted into solution) are analyzed to detect contaminants. Samples that can be analyzed include (but not limited to) water sources, waste water, food and soil. Contaminants to be detected include (but not limited to) bacteria pesticides, antibiotics, and microplastics. In some embodiments, various plastics can be analyzed to identification of polymer type, which may be useful in a contamination screen or recycling program.

Several embodiments implement pathogen identification with optical spectroscopy. Some embodiments combine pathogen detection, identification and antibiotic susceptibility testing in one step. A number of embodiments enable culture free and label free pathogen diagnostics and antibiotic susceptibility testing. Several embodiments implement inkjet printers to prepare samples in solution for optical spectroscopy. Examples of a pathogen include (but are not limited to): bacteria, virus, fungus, and microorganism. Examples of optical spectroscopies include (but are not limited to): Raman spectroscopy, absorption spectroscopy, vibrational spectroscopy. Many embodiments can classify pathogen incorporating machine learning process. Several embodiments can identify bacterial bloodstream infections (BSIs). Some embodiments diagnose antibiotic susceptibility of the pathogen. A number of embodiments are able to determine the minimum inhibitory concentration (MIC). Many embodiments can achieve single cell sensitivity to identify pathogen. In several embodiments, time to identify pathogen can be reduced from days to minutes. Some embodiments are able to identify pathogen in solution in less than 1 hour.

One embodiment of the invention includes a method to identify particle in a sample comprising obtaining a sample from a source; mixing the sample with a solution; printing the mixed sample solution into microdroplets onto a substrate with a printer; imaging the substrate with an optical spectroscopy; analyzing an optical spectrum and identifying particle specific features from the optical spectrum.

In a further embodiment, the sample is an environmental sample and the source is a water source, waste water, food or soil.

In another embodiment, the sample is a biological sample extracted from an individual and the biological sample is blood, plasma, lymph, saliva, mucus, sweat, urine, stool or cellular solution.

A still further embodiment, the particle in a sample is a bacteria pesticide, antibiotic or microplastic.

In still another embodiment, the particle in a sample is a pathogen and the pathogen is a bacterium, virus, fungus, microorganism, yeast, circulating tumor cell, exosome, extracellular vesicle or biomarker.

In a yet further embodiment, the solution comprises plasmonic nanoparticle.

In a yet further embodiment again, the solution comprises gold plasmonic nanoparticle.

In another embodiment again, the plasmonic nanoparticle has a shape selected from the group consisting of nanoshell, nanoflower, nanorod or nanostar.

In a further additional embodiment, the microdroplets are between around 15 microns and around 300 microns in diameter.

In another additional embodiment, the microdroplets are between around 25 microns and around 280 microns in diameter.

In a still yet further embodiment, the microdroplets are between around 15 microns and around 50 microns in diameter.

In still yet another embodiment, the microdroplet comprises at least one cell.

In a still further embodiment again, the printer is an inkjet printer or an acoustic inkjet printer.

In still another embodiment again, the acoustic inkjet printer is a micro-electro-mechanical acoustic inkjet printer.

In a still further additional embodiment, the acoustic inkjet printer has a transducer and the transducer has frequency between around 100 MHz and around 200 MHz.

In a further embodiment, the transducer frequency is around 5 MHz, around 15 MHz or around 45 MHz.

In still another embodiment, the optical spectroscopy is a Raman spectroscopy.

In a yet further embodiment, the Raman spectroscopy is a surface enhanced Raman spectroscopy.

In another additional embodiment, the Raman spectroscopy comprises Bragg tunable filters.

In a still further embodiment again, the features from an optical spectrum identifies a cell type, a bacterium strain, or a biomolecule.

Still another additional embodiment includes a method to diagnose bacterial bloodstream infection comprising obtaining a blood sample from an individual; mixing the blood sample with a solution, wherein the solution comprises plasmonic nanoparticles; printing the mixed blood sample solution into microdroplets onto a substrate with a printer; imaging the substrate with a surface enhanced Raman spectroscopy; identifying bacterial species from a Raman spectrum.

In still another embodiment, the plasmonic nanoparticle comprises gold.

In a yet further embodiment, the plasmonic nanoparticle has a shape selected from the group consisting of nanoshell, nanoflower, nanorod or nanostar.

In another further embodiment, the nanostar and nanorod plasmonic nanoparticle have peak surface enhanced Raman scattering enhancement of at least 10E6.

In a yet another embodiment, the microdroplets are between around 15 microns and around 300 microns in diameter.

In another further additional embodiment, the microdroplets are between around 25 microns and around 280 microns in diameter.

In still yet another further embodiment, the microdroplets are between around 15 microns and around 50 microns in diameter.

In a further embodiment, the microdroplet comprises at least one cell.

In a still further embodiment again, the printer is an inkjet printer or an acoustic inkjet printer.

In another embodiment again, the acoustic inkjet printer is a micro-electro-mechanical acoustic inkjet printer.

In a further additional embodiment, the acoustic inkjet printer has a transducer and the transducer has frequency between around 100 MHz and around 200 MHz.

In another additional embodiment, the transducer frequency is around 5 MHz, around 15 MHz or around 45 MHz.

In a still yet further embodiment, the surface enhanced Raman spectroscopy imaging is in a liquid cell.

In still yet another embodiment, the surface enhanced Raman spectroscopy comprises Bragg tunable filters.

In a still further embodiment again, the identification of bacteria species takes less than 1 hour.

Another further embodiment again includes a method to perform antibiotic susceptibility testing comprising: obtaining a blood sample from an individual; mixing the blood sample with a solution, wherein the solution comprises plasmonic nanoparticles; printing the mixed blood sample solution into microdroplets onto a substrate with a printer; imaging the substrate with a surface enhanced Raman spectroscopy to obtain a first Raman spectrum; adding an antibiotic to the substrate; imaging the substrate with the surface enhanced Raman spectroscopy to obtain a second Raman spectrum; comparing Raman signature differences in the first and second Raman spectrum and identifying antibiotic susceptibility.

In a still further embodiment, the plasmonic nanoparticle comprises gold.

In a yet further embodiment, the plasmonic nanoparticle has a shape selected from the group consisting of nanoshell, nanoflower, nanorod or nanostar.

In yet another embodiment, the nanostar and nanorod plasmonic nanoparticle have peak surface enhanced Raman scattering enhancement of at least 10E6.

In a further embodiment again, the microdroplets are between around 15 microns and around 300 microns in diameter.

In another embodiment again, the microdroplets are between around 25 microns and around 280 microns in diameter.

In a still yet further embodiment, the microdroplets are between around 15 microns and around 50 microns in diameter.

In another additional embodiment, the microdroplet comprises at least one cell.

In a still further embodiment again, the printer is an inkjet printer or an acoustic inkjet printer.

In a still further additional embodiment, the acoustic inkjet printer is a micro-electro-mechanical acoustic inkjet printer.

In still another embodiment again, the acoustic inkjet printer has a transducer and the transducer has frequency between around 100 MHz and around 200 MHz.

In a further embodiment, the transducer frequency is around 5 MHz, around 15 MHz or around 45 MHz.

In a still further embodiment again, the surface enhanced Raman spectroscopy imaging is in a liquid cell.

In another embodiment, the surface enhanced Raman spectroscopy comprises Bragg tunable filters.

In yet another embodiment, antibiotic susceptibility testing takes less than 1 hour.

Still another additional embodiment includes a method of administering a treatment to an individual with a pathogenic infection comprising: extracting or having extracted a biological sample from an individual; performing or having performed surface enhanced Raman spectroscopy on the biologic sample to reveal Raman signatures of the biological sample; detecting or having detected a pathogen infection in the biological sample utilizing the Raman signatures of the biological sample; administering a medication to the individual to treat the pathogen infection.

In a still further embodiment, the biological sample is blood, plasma, lymph, saliva, mucus, sweat, urine, stool or cellular solution.

In a yet another embodiment, the pathogen is a bacterium and the individual is administered an antibiotic.

In a yet still further embodiment, the antibiotic is vancomycin, ceftriaxone, penicillin, daptomycin, meropenem, ciprofloxacin, piperacillin-tazobactam (TZP), or caspofungin.

A yet further embodiment again includes a method of administering an antibiotic to an individual comprising: extracting or having extracted a biological sample from an individual; performing or having performed surface enhanced Raman spectroscopy on the biologic sample to reveal Raman signatures of the biological sample; detecting or having detected an antibiotic susceptibility in the biological sample utilizing the Raman signatures of the biological sample; administering the antibiotic to the individual to treat the susceptible pathogens.

In a still yet further embodiment, the biological sample is blood, plasma, lymph, saliva, mucus, sweat, urine, stool or cellular solution.

In still another embodiment again, the pathogen is a bacterium.

In a still further embodiment, the antibiotic is vancomycin, ceftriaxone, penicillin, daptomycin, meropenem, ciprofloxacin, piperacillin-tazobactam (TZP), or caspofungin.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

DETAILED DESCRIPTION

Figure 1:
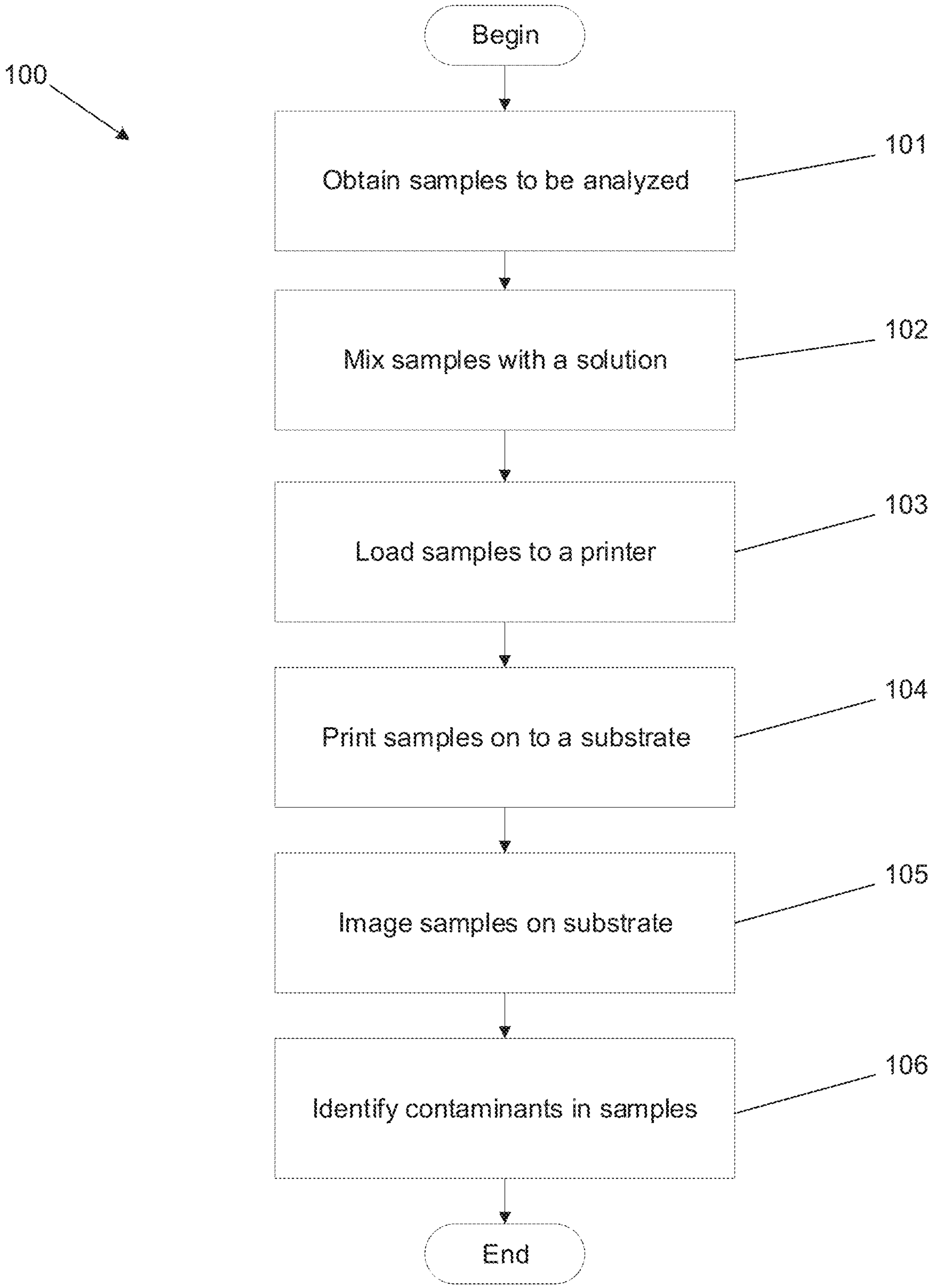
FIG. 1 illustrates a particle identifying process in accordance with an embodiment of the invention.

Turning now to the drawings and data, methods and systems to detect particles in a solution utilizing optical spectroscopy are provided. In many embodiments, contamination of environmental samples (in solution or diluted into solution) can be detected. Samples that can be analyzed include (but not limited to) water sources, waste water, food and soil. Contaminants to be detected include (but not limited to) bacteria pesticides, antibiotics, and microplastics. In some embodiments, various plastics can be analyzed to identification of polymer type, which may be useful in a contamination screen or recycling program.

In many embodiments, biological samples (in solution or diluted into solution) can be analyzed to detect pathogens. Many embodiments combine pathogen detection, identification and antibiotic susceptibility testing in one step. Several embodiments could enable full bacterial bloodstream infections (BSIs) diagnostics in less than an hour. Some embodiments enable culture free and label free BSI diagnostics and antibiotic susceptibility testing.

Most BSI diagnostics rely on century-old culturing methods. Notably, blood can be drawn and bacteria can be allowed to multiply and grow until they become detectable—a process that is naturally slow and can take days even in advanced facilities. If the blood culture is positive, then additional diagnostic tests may be needed to identify the bacterial species, strain, and antibiotic susceptibility, typically requiring an additional 12 to 24 hours. Until lab results are available, patients are given broad-spectrum antibiotic treatments based on empiric guidelines. More than 90% of patients presenting with BSI symptoms can have a negative blood culture, and thus can be unnecessarily treated with antibiotics or given the wrong type or dose. Beyond increasing the risks associated with a possibly ineffective treatment and the economic burden of prolonged hospital stays, such use of broad-spectrum antibiotics promotes the evolution of new strains of antibiotic resistant bacteria.

Single-step detection, identification, and antibiotic susceptibility testing remains an open challenge. Recognizing the need for improved speed, sensitivity, and specificity in detecting bacterial bloodstream infections, several technologies may have gained traction for pathogen identification and antibiotic susceptibility testing (AST). Promising technologies include matrix-assisted laser desorption ionization—time of flight mass spectroscopy (MALDI-TOF MS), polymerase chain reaction (PCR), and magnetic bead labelling.

MALDI-TOF MS is currently used at many hospitals and relies on mass spectroscopy of pathogens. By correlating the proteome profile obtained by mass spectroscopy with a database of pathogen-derived small ribosome proteins, BSIs can be accurately and rapidly identified. However, the technique relies on positive blood culture and cannot provide information about antibiotic susceptibility and the pathogen's minimum inhibitory concentration (MIC) of antibiotics. MIC of antibiotics tests may be conducted after MALDI-TOF and take an additional 12 to 24 hours. Similarly, PCR also identifies pathogens from positive blood cultures by detecting and amplifying specific genomic sequences of the pathogen. PCR can also detect certain genes known to cause monogenetic antimicrobial resistance for two classes of antibiotics, providing insight into antibiotic susceptibility. Several FDA-approved PCR platforms can identify MRSA/MSSA from positive blood cultures; identify 27 total pathogens with 98% sensitivity and 99.9% specificity as well as the three antibiotic resistant genes responsible for methicillin resistance, vancomycin resistance and carbapenem resistance. However, the number of pathogenic strains that can be detected can be limited by the available number of PCR primers in a given platform. Additionally, information about MIC and optimized antibiotic treatment cannot be provided.

To avoid sample culturing, a platform that uses magnetic particle labeling to detect pathogens directly from whole blood has been developed. Here, pathogen identification can be achieved by detecting a change in the magnetic properties of the sample medium arising from the clustering of magnetic nanoparticles initiated by the presence of targeted pathogens. Clinical tests of this technology have shown 89.5% sensitivity and 98.4% specificity. However, this technology cannot rule out BSI and cannot identify the antibiotic susceptibility of the detected pathogen nor its MIC. It is also limited by the availability of magnetic labels for a particular pathogen.

Therefore, most technologies in BSI detection, identification, and AST can take days. Many embodiments can combine pathogen detection, identification and antibiotic susceptibility testing in one step. Such a combination could enable full BSI diagnostics in under an hour in accordance with several embodiments. Certain embodiments are capable of culture free and label free BSI diagnostics and antibiotic susceptibility testing.

In many embodiments, solution samples can be prepared using a label-free process. Some embodiments prepare the solution samples by mixing with non-binding plasmonic nanoparticles. Examples of solution samples can include (but are not limited to): biofluid, saliva, sweat, lymph, mucus, urine, stool, whole-blood, plasma, cellular solution, throat swab liquid culture, water source, waste water. Examples of a pathogen in solution include (but are not limited to): bacteria, virus, fungus, microorganism, yeast, circulating tumor cell, exosome, extracellular vesicle, and biomarker. Several embodiments incorporate inkjet-type printing to prepare the solution samples on a substrate. Certain embodiments can inkjet print the solution samples in microdroplets. Some embodiments perform imaging of the printed samples on the substrate with optical spectroscopies. Examples of optical spectroscopies include (but are not limited to): Raman spectroscopy, absorption spectroscopy, vibrational spectroscopy. In numerous embodiments, optical spectra signatures can be used to determine and/or differentiate pathogens in solution samples. Many embodiments can achieve single cell sensitivity in pathogen identification. Several embodiments can identify and characterize a cell type, a bacteria strain, and/or biomolecules. A number of embodiments can diagnose BSIs. In many embodiments, the pathogen identification process can be shortened from days to hours. Several embodiments are able to identify pathogens in less than one hour.

Many embodiments combine pathogen detection, identification and antibiotic susceptibility testing in a single diagnostic step, eliminating the need for culturing. Several embodiments incorporate surface enhanced Raman scattering (SERS) and realize single-molecule sensitivity in pathogen identification. Because of the unique molecular structure of a pathogen's cell membrane, each bacterial species has a specific SERS signature that can be used for identification. In many embodiments, SERS can be label-free and generalizable to all types of bacterial, viral and fungal pathogens. In several embodiments, SERS signatures of pathogens can convey information both about the pathogenic strain and its antibiotic susceptibility and/or resistance. In some embodiments, changes to SERS signatures upon antibiotic exposure can be used to monitor changes to cell membrane structure and cell viability, facilitating real-time antibiotic susceptibility testing. In a number of embodiments, SERS may enable determination of the MIC of antibiotics for a specific pathogen without in vitro antibiotic susceptibility testing for personalized, targeted and optimized antibiotic treatment.

Various embodiments are directed towards detecting pathogens in a biological sample. In some embodiments, a biological sample can be extracted from an individual, processed, and printed onto a substrate utilizing microdroplets, which are then imaged utilizing Raman spectroscopy. In many embodiments, biological samples can be mixed with non-binding plasmonic nanoparticles. In several embodiments, the mixed solution samples can be split into microdroplets using inkjet-type biological printing. Each microdroplet may contain one cell and a homogeneous dispersion of nanoparticles in accordance with some embodiments. The nanoparticles can enhance the scattering from cells, enabling fast and sensitive spectral imaging with a large-area SERS camera. In many embodiments, millions of droplets can be simultaneously imaged while machine learning algorithms identify the presence or absence of bacteria, as well as the species, strain, antibiotic susceptibility and the MIC of any potential pathogen. In many embodiments, solutions are printed onto a substrate utilizing microdroplets, which are then imaged utilizing Raman spectroscopy. In several embodiments, Raman spectral signatures are used to determine and/or differentiate contaminants in the solution.

Systems and methods for determining and identifying pathogen in solution using optical spectroscopies in accordance with various embodiments of the invention are discussed further below.

Particle Identification Process

Many embodiments utilize printing techniques including (but not limited to) inkjet printing and optical spectroscopies including (but not limited to) Raman spectroscopy to identify particles including (but not limited to) bacteria, virus, fungus, microorganism, cell, pesticides, antibiotics, and microplastics in solution samples. A method for determining particles in accordance with an embodiment of the invention is illustrated in FIG. 1. The process 100 can begin by obtaining a solution sample (101). Some embodiments include biological samples including (but not limited to) biofluids, whole blood, plasma, lymph, saliva, mucus, urine, stool, throat swab liquid culture, and/or cellular solutions as solution samples. In some embodiments, a sample is an environmental sample. Environmental samples include (but not limited to) water sources, waste water, food and soil. In some embodiments, a biological sample extracted from an individual is used. In some embodiments, samples are put into solution or further diluted in a liquid. In some embodiments, samples are partially processed (e.g., centrifugation, filtration, etc.). In some embodiments, samples used as extracted from the source. As can readily be appreciated, any of a variety of solution samples can be utilized as appropriate to the requirements of specific applications in accordance with various embodiments of the invention.

Samples can be prepared by mixing with a solution (102). In some embodiments, nanoparticles can be added to a sample solution. Nanoparticles present in the solution may enhance optical spectra signatures of contaminants within the solution. In some embodiments, nanoparticles can be plasmonic nanoparticles. In a number of embodiments, nanoparticles are gold nanoparticles. In certain embodiments, nanoparticles can be provided in various geometries including (but not limited to) spheres, rods, core-shells, flowers, and stars. In many embodiments, the sample can be mixed with universal bacterial labels. The bacterial labels in accordance with several embodiments can label specifically to bacterial species, but not other mammalian cell in the sample. As can readily be appreciated, any of a variety of mixing solution can be utilized as appropriate to the requirements of specific applications.

In a number of embodiments, the mixed solutions can be loaded to a printer (103). In several embodiments, the printer is an inkjet printer.

In several embodiments, samples are printed and fixed to a substrate (104). In various embodiments, a liquid printer provides an array of microdroplets onto a 2-dimensional substrate. In some embodiments, acoustic printing can be utilized. Many embodiments implement acoustic inkjet printing technique. In some embodiments, a micro-electro-mechanical (MEMS) acoustic-inkjet machine provides a means to deliver liquid samples onto a substrate.

In many embodiments, samples are in a solution and inkjet printer can be utilized to form droplets of the sample onto a substrate. In some embodiments, the size of droplets can be controlled such that each droplet only has one or a few contaminants. In several embodiments, each droplet contains at least one cell. In some embodiments, the at least one cell in a droplet is in dispersion of nanoparticles. In a number of embodiments, droplets can be remained in the liquid form on the substrate. In some embodiments, sample are dried onto the substrate such that it is fixed. Examples of a substrate include (but are not limited to): a glass slide, a silicon wafer, a gold-coated slide, a paper. Several embodiments implement a substrate with specific metallic and/or dielectric nanopatterns. The nanopatterns in accordance with some embodiments can enhance the optical signature from the printed particles. In a number of embodiments, the optical enhancement can be broadband and/or specific to certain wavelengths. As can readily be appreciated, any of a variety of printing techniques can be utilized as appropriate to the requirements of specific applications in accordance with various embodiments of the invention.

With samples fixed onto the substrate, the samples can be optically imaged and characterized utilizing an optical scanner (105). In several embodiments, the scanner can capture both the printed cell and/or bacteria size and shape as well as the spectral signatures. The optical imaging system can be integrated with low-cost CMOS sensors in accordance with some embodiments. Many embodiments implement a Raman spectroscopy as an optical scanner. In some embodiments, spectral imaging is performed such that the entire substrate is imaged. In some embodiments, line scanning is performed and repeated to image the substrate. To perform Raman spectroscopy, in some embodiments, a confocal Raman scanner is utilized to image the substrate. In some embodiments, a wide-field hyperspectral Raman imaging system is utilized to image the substrate. In some embodiments, Bragg tunable filters to achieve high throughput with high transmission efficiencies. In some embodiments, integral field spectroscopy is utilized to achieve high spectral resolution. In some embodiments, only certain bands of spectra that are necessary to detect and/or differentiate contaminants in solution are imaged. By imaging a subset of spectra, the time required to image a substrate can be reduced. In addition, the time and effort to analyze the imaging result can be reduced. As can readily be appreciated, any of a variety of optical imaging and/or scanning technique can be utilized as appropriate to the requirements of specific applications in accordance with various embodiments of the invention.

Based on the imaging results, contaminants in the sample can be identified by their spectral signatures (106). As various contaminants have a unique signature, contaminants can be identified by their signature. The spectral information collected by the scanning system can be processed in real-time and analyzed against a library of pathogen and cellular optical signatures in accordance with several embodiments. In some embodiments, a clustering technique is utilized to differentiate contaminants. Clustering techniques include (but not limited to) principal component analysis (PCA). In some embodiments, especially in scenarios that confounding signatures need to be differentiated, a machine learning model is utilized to differentiate and specifically identify various contaminants. Machine learning models include (but not limited to) a neural network, regression, or support vector machine (SVM).

While various processes of identifying contaminants in a sample are described above with reference to FIG. 1, any of a process that includes various steps of the process can be performed in different orders and that certain steps may be optional according to some embodiments of the invention. As such, it should be clear that the various steps of the process could be used as appropriate to the requirements of specific applications. Furthermore, any of a variety of processes for identifying contaminants in a sample appropriate to the requirements of a given application can be utilized in accordance with various embodiments of the invention. Processes for identifying desired pathogen in solution in accordance with various embodiments of the invention are discussed further below.

Pathogen Identification Process in Blood Samples

Figure 2:
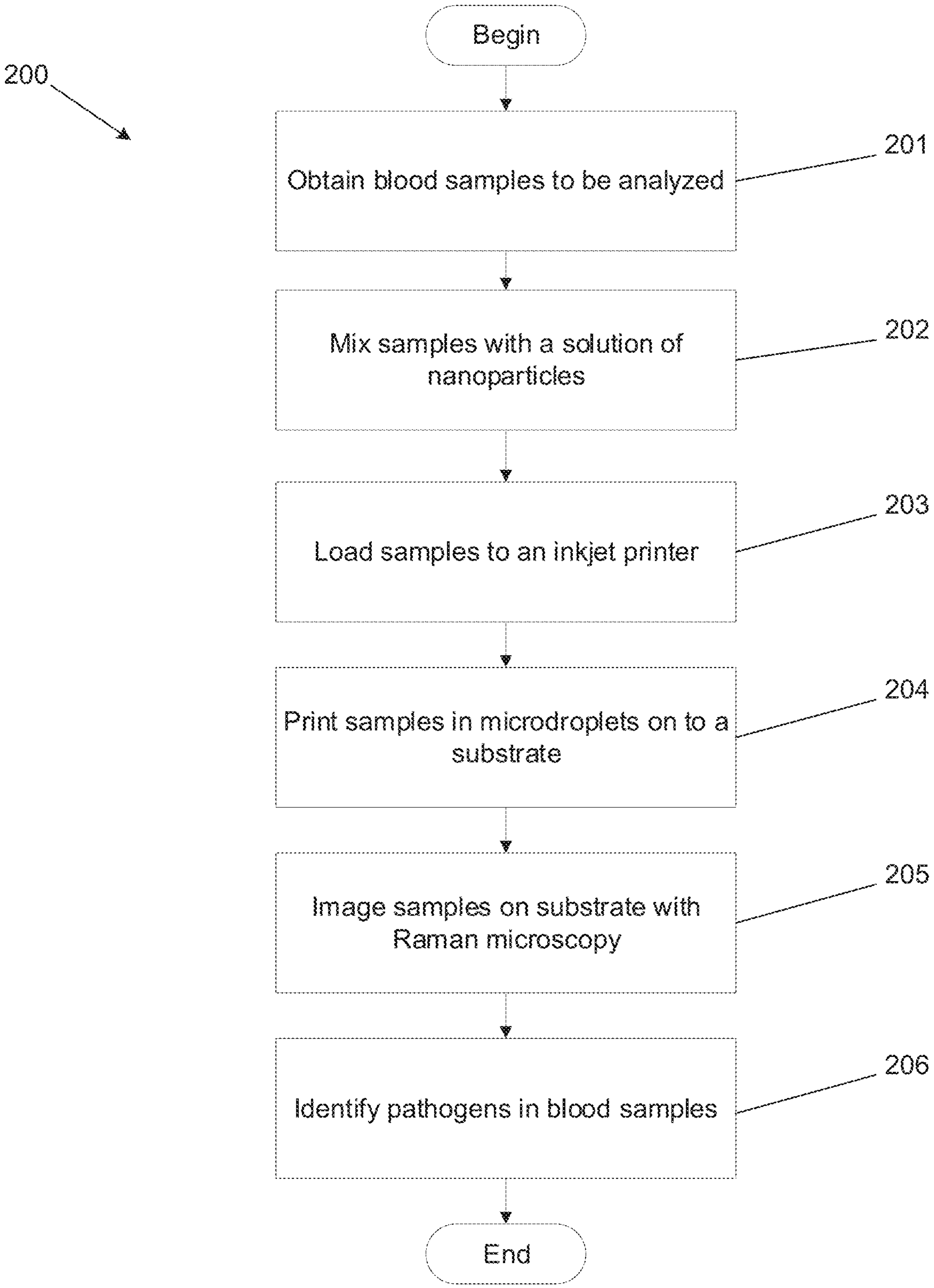
FIG. 2 illustrates a pathogen identifying process in blood in accordance with an embodiment of the invention.

Many embodiments utilize inkjet printing techniques and surface enhanced Raman spectroscopy (SERS) to identify pathogens including (but not limited to) bacteria, virus, fungus, microorganism, circulating tumor cell, and cell in blood samples. In several embodiments, SERS microdroplet process can identify and diagnose pathogen in less than an hour. A method for determining pathogens in accordance with an embodiment of the invention is illustrated in FIG. 2. The process 200 can begin by obtaining a blood sample (201). In some embodiments, a blood sample can be collected from an individual. Various samples can be processed or used as extracted. In some embodiments, samples are put into solution or further diluted in a liquid. In some embodiments, samples are partially processed (e.g., centrifugation, filtration, etc.). In some embodiments, samples used as extracted from the source. For example, blood samples can be centrifuged such that analysis is performed on plasma. Alternatively, whole blood can be used directly without processing. As can readily be appreciated, any of a variety of blood samples can be utilized as appropriate to the requirements of specific applications in accordance with various embodiments of the invention.

Samples can be prepared by mixing with a solution containing nanoparticles (202). Nanoparticles present in the solution may enhance Raman spectra signatures of pathogens within the solution. In some embodiments, nanoparticles can be plasmonic nanoparticles. In a number of embodiments, nanoparticles are gold nanoparticles. In certain embodiments, nanoparticles can be provided in various geometries including (but not limited to) spheres, rods, core-shells, flowers, and stars. As can readily be appreciated, any of a variety of nanoparticle solution can be utilized as appropriate to the requirements of specific applications.

In a number of embodiments, the mixed solutions can be loaded to an inkjet printer (203). In several embodiments, samples are printed and fixed to a substrate (204). In various embodiments, a liquid printer provides an array of microdroplets onto a 2-dimensional substrate. In some embodiments, acoustic printing can be utilized. Many embodiments implement acoustic inkjet printing technique. In some embodiments, a micro-electro-mechanical (MEMS) acoustic-inkjet machine provides a means to deliver liquid samples onto a substrate.

In many embodiments, blood samples are in a solution and inkjet printer can be utilized to form microdroplets of the sample onto a substrate. In some embodiments, the size of droplets can be controlled such that each droplet only has one or a few pathogens. In several embodiments, each microdroplet contains at least one cell. In some embodiments, the at least one cell in a microdroplet is in dispersion of nanoparticles. In a number of embodiments, droplets can be remained in the liquid form on the substrate. In some embodiments, sample are dried onto the substrate such that it is fixed. As can readily be appreciated, any of a variety of inkjet printing techniques can be utilized as appropriate to the requirements of specific applications in accordance with various embodiments of the invention.

With blood samples fixed onto the substrate, the samples can be optically imaged and characterized utilizing a Raman spectroscopy (205). In several embodiments, the scanner can capture both the printed cell and/or bacteria size and shape as well as the spectral signatures. The optical imaging system can be integrated with low-cost CMOS sensors in accordance with some embodiments. In some embodiments, spectral imaging is performed such that the entire substrate is imaged. In some embodiments, line scanning is performed and repeated to image the substrate. In some embodiments, a confocal Raman scanner is utilized to image the substrate. In some embodiments, a wide-field hyperspectral Raman imaging system is utilized to image the substrate. In some embodiments, Bragg tunable filters to achieve high throughput with high transmission efficiencies. In some embodiments, integral field spectroscopy is utilized to achieve high spectral resolution. In some embodiments, only certain bands of Raman spectra that are necessary to detect and/or differentiate contaminants in solution are imaged. By imaging a subset of spectra, the time required to image a substrate can be reduced. In addition, the time and effort to analyze the imaging result can be reduced. As can readily be appreciated, any of a variety of Raman scanning technique can be utilized as appropriate to the requirements of specific applications in accordance with various embodiments of the invention.

Based on the imaging results, pathogens in the sample can be identified by their spectral signatures (206). As various pathogens have a unique signature, pathogens can be identified by their signature. The SERS spectral information collected by the Raman scanning system can be processed in real-time and analyzed against a library of pathogen and cellular optical signatures in accordance with several embodiments. In some embodiments, a clustering technique is utilized to differentiate contaminants. Clustering techniques include (but not limited to) principal component analysis (PCA). In some embodiments, especially in scenarios that confounding signatures need to be differentiated, a machine learning model is utilized to differentiate and specifically identify various contaminants. Machine learning models include (but not limited to) a neural network, regression, or support vector machine (SVM).

Figure 3:
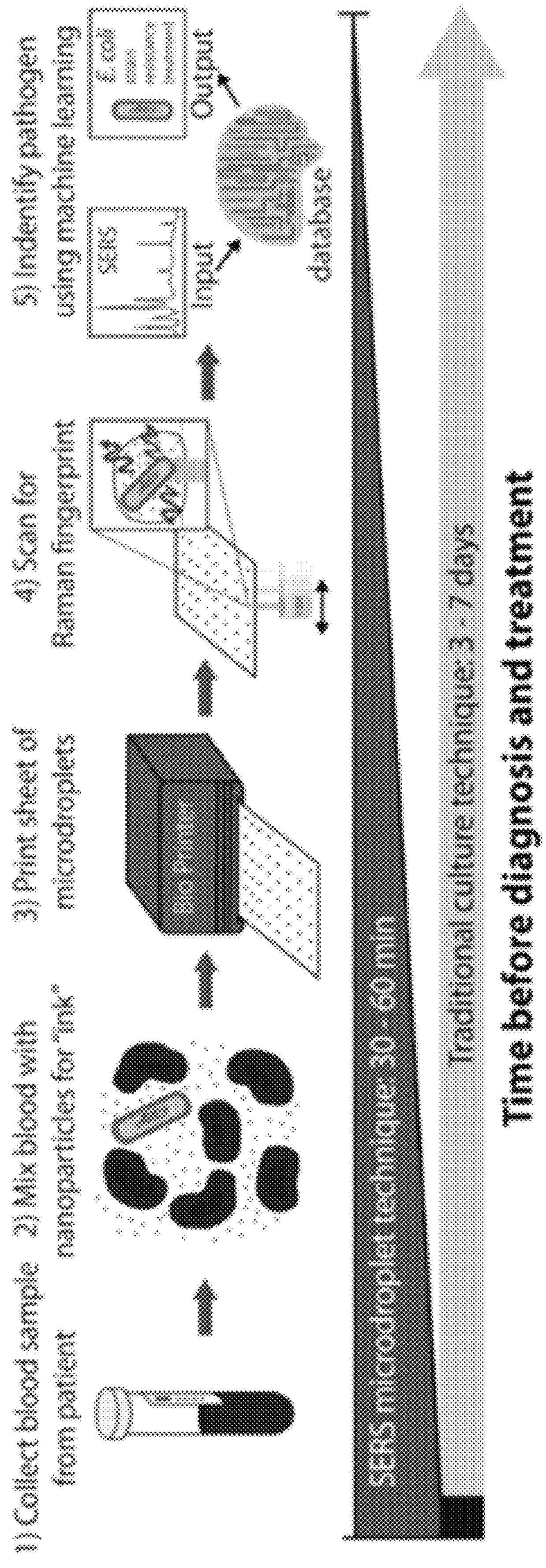
FIG. 3 illustrates a process for determining pathogens using surface enhanced Raman scattering (SERS) microdroplet technique in accordance with an embodiment of the invention.

A process for determining pathogens using SERS microdroplet technique in accordance with an embodiment of the invention is illustrated in FIG. 3. Time before diagnosis and treatment can be reduced to between 30 to 60 minutes with SERS microdroplet technique in accordance with some embodiments, compared to 3 to 7 days using traditional culture technique.

While various processes of identifying pathogens in a blood sample are described above with reference to FIGS. 2 and 3, any of a process that includes various steps of the process can be performed in different orders and that certain steps may be optional according to some embodiments of the invention. As such, it should be clear that the various steps of the process could be used as appropriate to the requirements of specific applications. Furthermore, any of a variety of processes for identifying pathogens in a blood sample appropriate to the requirements of a given application can be utilized in accordance with various embodiments of the invention. Processes for preparing solution samples in accordance with various embodiments of the invention are discussed further below. Processes for preparing microdroplets samples in accordance with various embodiments of the invention are discussed further below.

Preparing Microdroplets Sample

Traditional SERS substrates have been shown to amplify signals over a million-fold, enabling even single-molecule detection using a cell phone. However, widespread adoption of SERS for pathogen detection has been hindered by two main limitations: 1) reproducibility and 2) limit of detection (LOD). Regarding reproducibility, variations in the morphology of the SERS substrate (typically a roughened metallic surface or a nanoparticle coating) can give rise to high variability in SERS spectra. Moreover, the reproducibility of SERS signals from a given pathogen has also been challenging because of the variations of the specific binding between the pathogen and the SERS-substrate. Secondly, in order to provide early detection of bacterial BSI, it should be able to detect pathogens in blood even when their concentration is as low as 1 CFU/mL. At such low concentrations, direct SERS-detection of pathogens may not be feasible because of the strong scattering from the red blood cells that outnumber pathogens by seven orders of magnitude. Several tactics such as preferential lysis of blood and on-chip electrophoresis have been studied to separate pathogens from blood. Such techniques, however, still require preculturing of the sample to achieve practical Raman-based identification.

To address these challenges, many embodiments replace traditional SERS-substrates with SERS-activated microdroplets, each containing a single cell in a dispersion of plasmonic nanoparticles. This architecture in accordance with several embodiments can allow the SERS-nanoparticles to more completely sample the surface area of the cell, providing reproducibility and more specific identification. Some embodiments can achieve detection sensitivity down to the bacterial strain and resistance level. Certain embodiments use acoustic bioprinting to facilitate the rapid splitting of whole blood into SERS-activated cellular microdroplets to enable Raman screening of blood at the single cell level. In certain embodiments, improved SERS geometries can enable improved classification.

Many embodiments implement surface enhanced Raman scattering (SERS) that utilizes inelastic photon scattering with single-molecule sensitivity enabled by metallic nanostructures. Because of the unique molecular structure of a pathogen's cell membrane, each bacterial species has a specific SERS signature that can be used for identification. SERS is label-free and generalizable to all types of bacterial, viral and fungal pathogens.

Several embodiments are directed towards preparing solution samples for particle detection. In many embodiments, particles of an environmental sample can be detected. Samples that can be analyzed include (but not limited to), water sources, waste water, food and soil. In several embodiments, pathogens of a biological sample can be detected. Samples that can be analyzed include (but not limited to), biofluid, saliva, sweat, lymph, mucus, urine, stool, whole-blood, plasma, cellular solution. In some embodiments, environmental and/or biological samples (in solution or diluted into solution) are analyzed to detect pathogens.

Samples can be prepared by mixing with a solution in several embodiments. Certain embodiments incorporate sample preparation that can enhance SERS performance. In some embodiments, nanoparticles can be added to a sample solution. Nanoparticles present in the solution may enhance optical spectra signatures of contaminants within the solution. Metallic nanoparticles with particular shape and specific optical resonance can enhance the Raman signature of the cells by orders of magnitude, enabling rapid optical interrogation of the sample. In some embodiments, nanoparticles can be plasmonic nanoparticles. In a number of embodiments, nanoparticles are metallic nanoparticles including (but not limited to) gold nanoparticles. In certain embodiments, nanoparticles can be provided in various geometries including (but not limited to) spheres, rods, core-shells, flowers, and stars. In many embodiments, nanoparticles can enhance SERS performance to at least $10^6$.

Many embodiments investigate the interaction of the nanoparticles with the cells, ensuring cell viability and exploring Raman spectra signatures enhancements. Several embodiments optimize the nanoparticle size, shape, and surfactant for maximal particle monodispersity, cell viability, resonant wavelength, and Raman enhancement by dispersing the particles on dried bacterial samples. Some embodiments implement optimized nanoparticles into single-cellular microdroplets. Using an optical spectroscopy including (but not limited to) confocal Raman spectroscopy, several embodiments interrogate how the Raman signature varies with nanoparticle geometry, concentration, and with antibiotic additives. In a number of embodiments, the scattering signal can be analyzed by machine learning algorithms that identify the pathogen, its antibiotic susceptibility and its MIC.

Figure 4A:
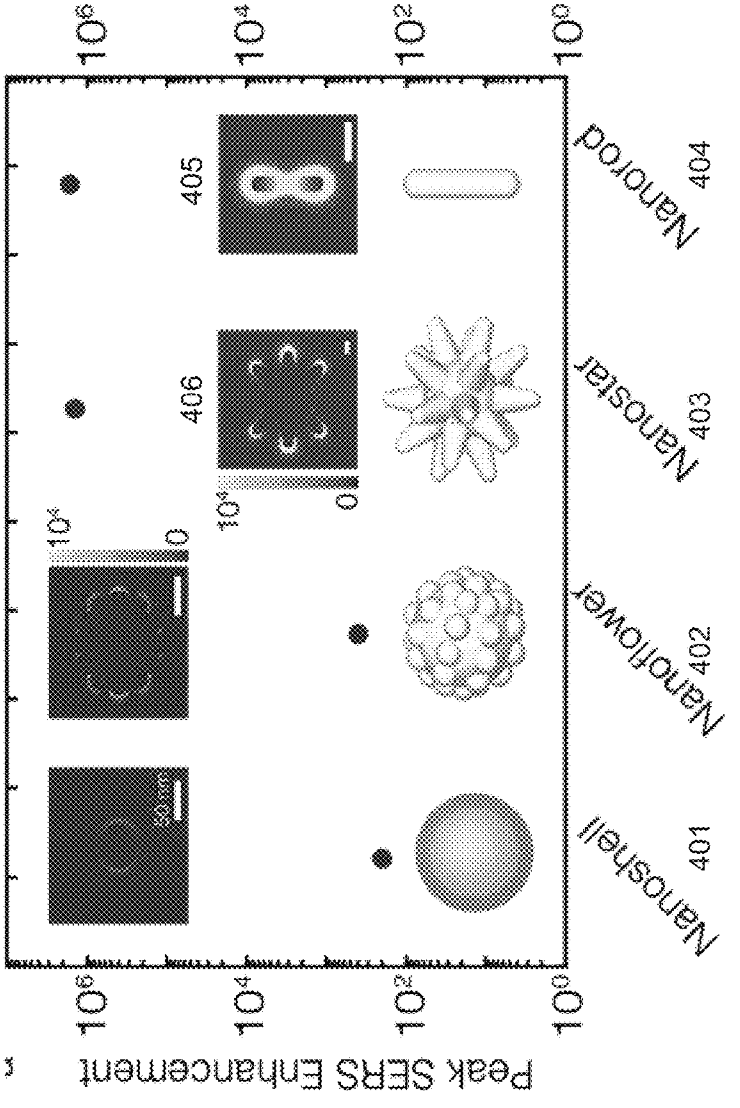
FIGS. 4A-4B illustrate plasmonic nanoparticles for SERS enhancement in accordance with an embodiment of the invention.
Figure 4B:
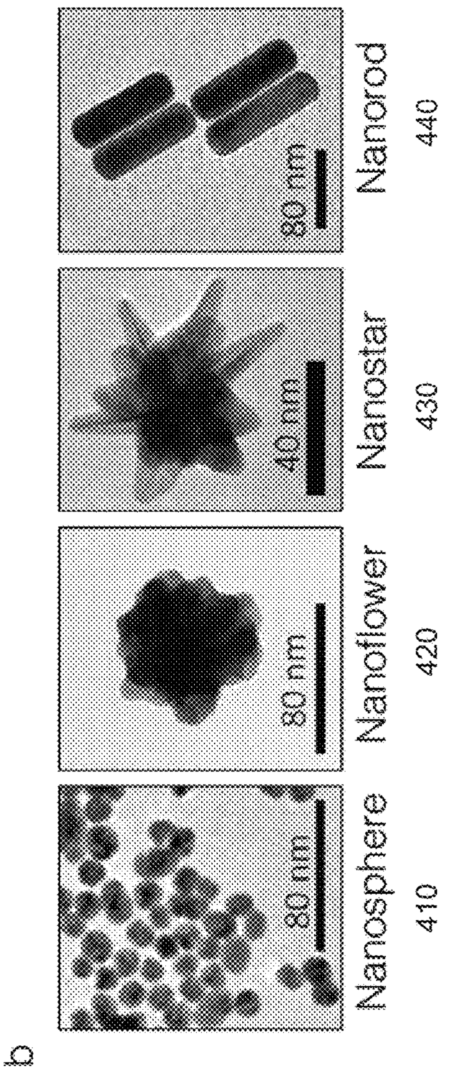

Many embodiments optimize the nanoparticle design, including (but not limited to) size, shape and material composition, the microdroplet volume, and the nanoparticle concentration within that volume. Several embodiments aim to maximize the signal-to-noise ratio with minimum integration time. Some embodiments can produce single-cellular *E. coli* microdroplets using microfluidic chips. In many embodiments, various plasmonic nanoparticle geometries are developed, including spheres, rods, and core-shells. Using full-field electromagnetic simulations, some embodiments explore SERS enhancements of the various nanoparticle geometries. FIG. 4A provides an example of SERS performance with different nanoparticle geometries in accordance with an embodiment of the invention. In FIG. 4B, nanoshell, nanoflower, nanorods and nanostars are tested. Nanorods 404 and nanostars 403 yield higher enhancements, with peak SERS enhancements around ~$10^6$, compared to nanoshell 401 and nanoflower 402 with SERS enhancements around $10^2$ and $10^3$. While the nanorods exhibit dual enhancement at both ends as shown in 405, the tips of the nanostars possess multiple Raman "hot-spots" as shown in 406. Many embodiments explore which geometry can provide an advantage for whole-cell Raman enhancement. By tailoring their size and aspect ratio, both nanorods and nanostars can be fully tunable across resonant wavelengths most relevant for Raman spectroscopy of pathogens. Several embodiments show that the length of the nanorod and the length of the star tips shifts the resonance of the particle to longer wavelengths, which can be an advantage in reducing background autofluorescence from biological materials.

Many embodiments implement colloidally synthesized nanospheres, nanorods, nanoflowers, and nanostars with varying size and surfactant coating including (but not limited to) HEPES and CTAB-NaOL. FIG. 4B illustrates the transmission electron microscopy (TEM) micrographs of colloidally synthesized Au nanoparticles of various shapes: nanosphere in 410, nanoflower in 420, nanostar in 430, and nanorod in 440.

Figure 5A:
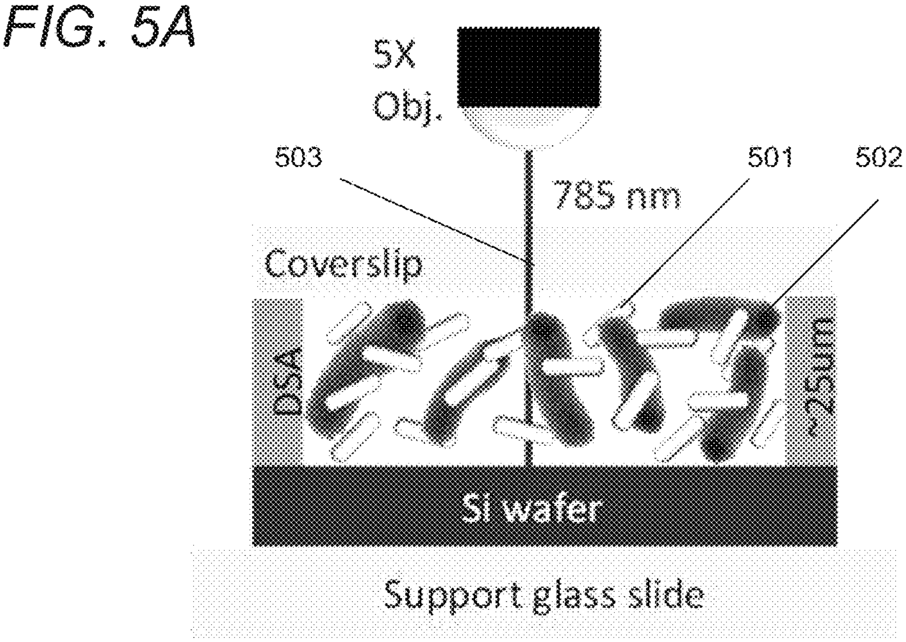
FIGS. 5A-5B illustrate gold nanorods improving Raman scattering signals in liquid cells in accordance with an embodiment of the invention.
Figure 5B:
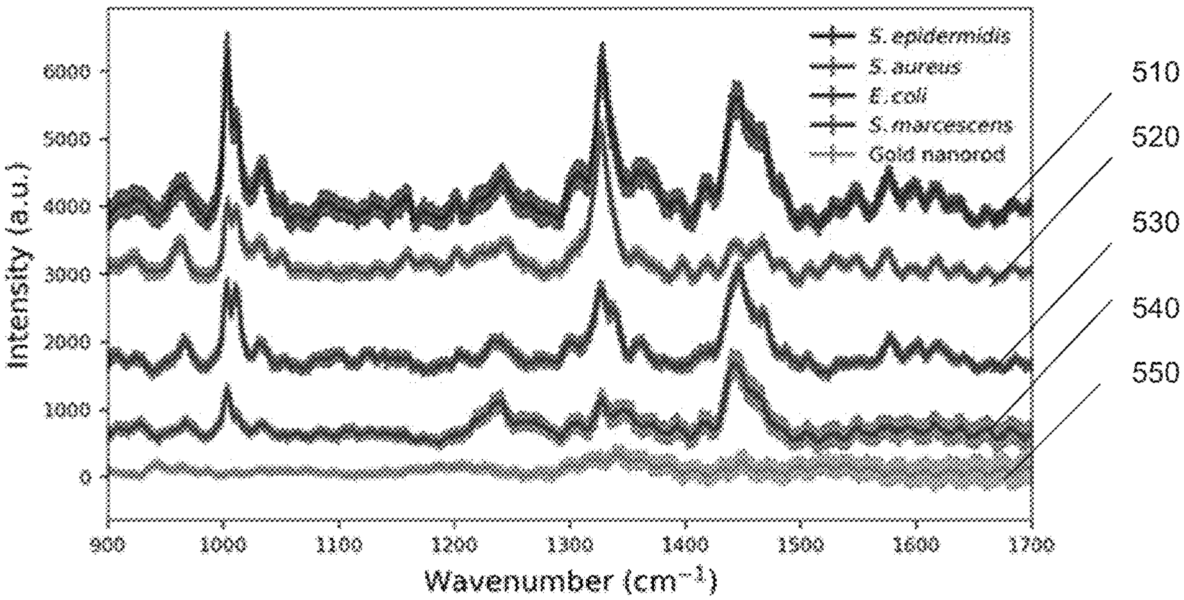

In many embodiments, nanorods dimensions can be optimized to maximize Raman scattering in liquid cells. Several embodiments show that nanorods with wavelength blue-shifted from the illumination laser can give strong signal from various types of bacteria. In some embodiments, the real-time response of bacteria to antibiotics introduced in the liquid cell can be monitored by observing the changes in their Raman spectral features. An example of gold nanorods improving Raman scattering signals in liquid cells is provided in FIGS. 5A and 5B in accordance with an embodiment of the invention. FIG. 5A illustrates an illumination laser with blue-shifted wavelength (503) imaging a mixed sample of different types of bacteria (502) and gold nanorods (501). FIG. 5B illustrates a Raman spectrum showing signal enhancement with the presence of gold nanorods in bacteria samples. Gold nanorod signal is shown in 550. 540 show gold nanorod in presence of *S. marcescens*. 530 show gold nanorod in presence of *E. coli*. 520 show gold nanorod in presence of *S. aureus*. 510 show gold nanorod in presence of *S. epidermidis*.

While specific examples of single-cellular microdroplets design are described in FIGS. 4 and 5, one of ordinary skill in the art can appreciate that various approaches of optimizing SERS nanoparticles are possible according to some embodiments of the invention. Furthermore, any of a variety of process to optimize Raman signal appropriate to the requirements of a given application can be utilized in accordance with various embodiments of the invention.

Many embodiments are able to generate single cellular microdroplets from plasma and whole blood using a piezoelectric transducer and a focusing acoustic lens. In several embodiments, the acoustic frequency and focusing strength can control the number of cells in each ejected microdroplet while simultaneously maintain cell viability. Utilizing the prepared biological sample, microdroplets can be formed onto a substrate in an array such that each droplet contains only one or a few cells. Any appropriate droplet technique can be utilized to achieve droplet size with one or few cells. In some embodiments SERS nanoparticles can be incorporated to generate optimized SERS-activated microdroplets from blood. A number of embodiments can fabricate an integrated array of acoustic ejectors that enables SERS-optimized blood printing at high speed and low-cost. The inkjet cartridges can be reusable via sterilization or disposable in accordance with several embodiments.

Figure 6:
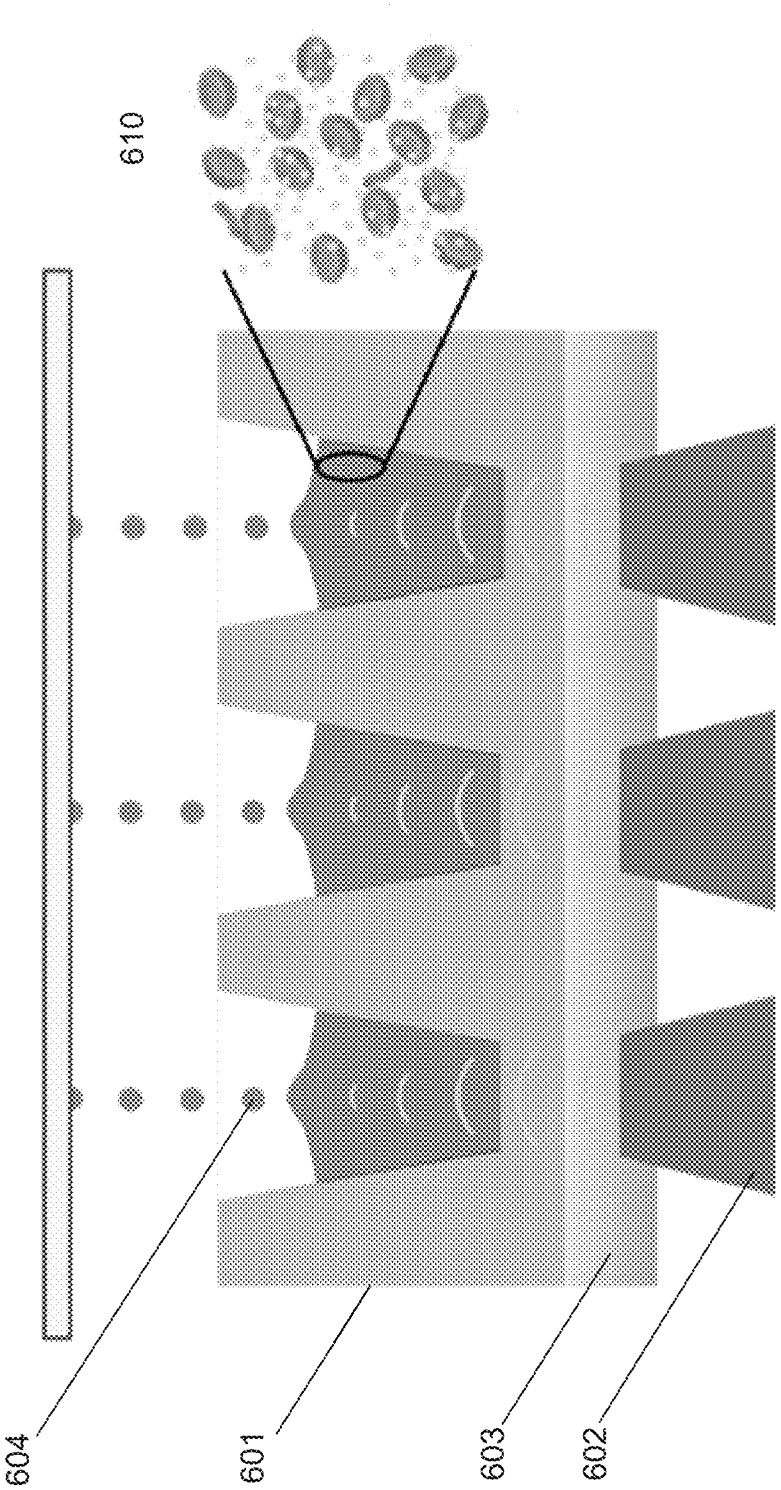
FIG. 6 illustrates an acoustic ejection platform printing microdroplets in accordance with an embodiment of the invention.

Many embodiments develop bioprinters to rapidly print whole blood samples. Several embodiments combine the integrated micro-electro-mechanical (MEMS) acoustic-inkjet technology and single cell line acoustic printing. In some embodiments, the bioprinting scheme can process milliliters of fluid in seconds. In several embodiments, focused sound beams can be used to eject microdroplets from an open-surface liquid with precise control of the microdroplet size and directionality. An example of cellular acoustic ejection platform in accordance with an embodiment of the invention is illustrated in FIG. 6. A mixture of whole blood and SERS nanoparticles (610) can be loaded into a disposable sample-well plate (601). Using an array of acoustic ejectors (602) with their acoustic waves focused at the liquid/air interface, cellular microdroplets (604) can be simultaneously ejected from the wells. A coupling medium (603) can be disposed between the acoustic ejectors and the sample-well plate.

In many embodiments, the acoustic waves not only eject microdroplets, but also enable continuous mixing of the mixture to avoid clumping and sample. Several embodiments include that the acoustic waves can be sculpted with acoustic lenses to enable efficient delivery of the cells to the ejection site. Some embodiments incorporating acoustic lenses may enable size-selective ejection.

Figure 7A:
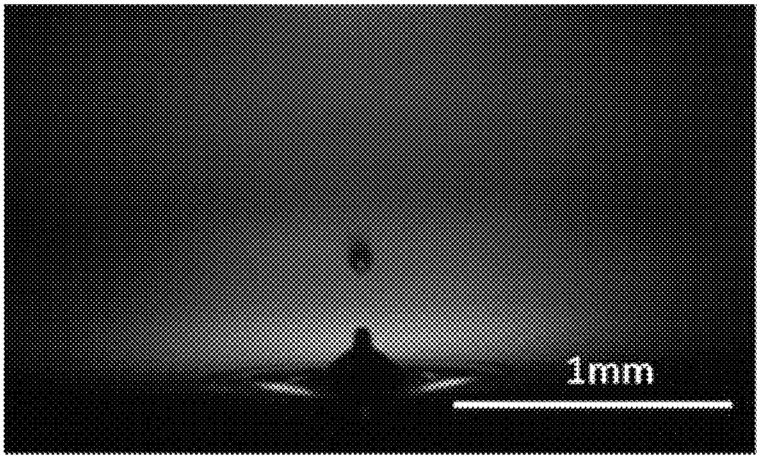
FIGS. 7A-7C illustrate acoustic ejection printing different liquid viscosities in accordance with an embodiment of the invention.
Figure 7B:
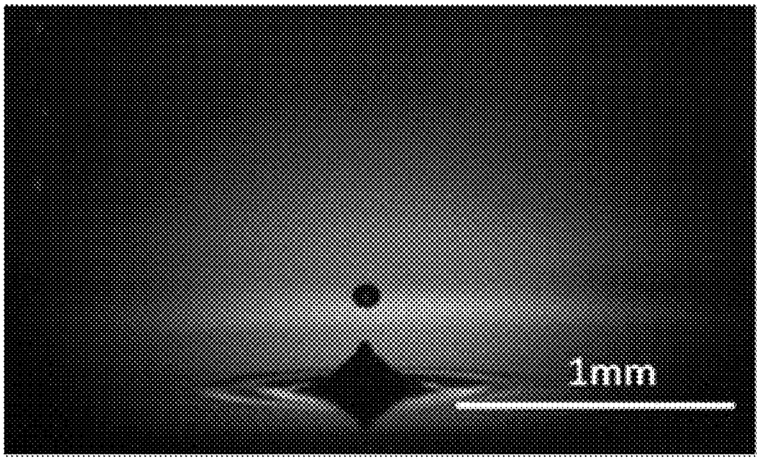
Figure 7C:
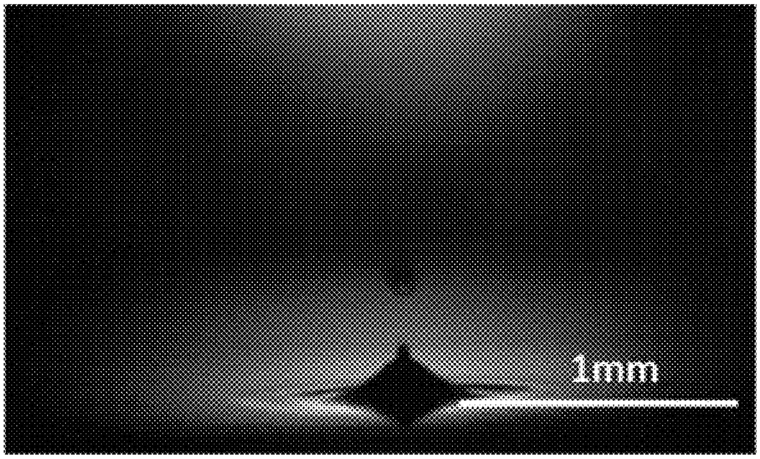

Many embodiments show that acoustic ejection enables rapid printing of cellular samples. In many embodiments, acoustic ejection process is nozzle free and enables clog free printing. Several embodiments show that droplet volumes of acoustic ejection can be in the range of pico-litters (pL), which is suitable for cellular encapsulation. In some embodiments, acoustic ejection is able to process tens of milliliters of fluid in a few minutes. An example of acoustic ejection of blood and plasma equivalent viscosities liquids is provided in FIGS. 7A-7C in accordance with an embodiment. FIG. 7A illustrates acoustic ejection with a 45 MHz transducer of liquid with viscosity around 1 cP—viscosity similar to plasma. FIG. 7B illustrates acoustic ejection with a 45 MHz transducer of liquid with viscosity around 2 cP. FIG. 7C illustrates acoustic ejection with a 45 MHz transducer of liquid with viscosity around 3 cP—viscosity similar to blood.

Several embodiments involve customized piezoelectric transducers to study the acoustic ejection from liquids with various viscosities. In some embodiments, characterization of the transducers includes (but not limited to) impedance characterization, hydrophone-mapping of the transducer acoustic radiation and pulse-echo measurement for transducer focal length measurements. Several embodiments use a stroboscopic imaging-setup and could characterize and optimize the ejection stability and the ejected microdroplet size uniformity and speed.

Figure 8A:
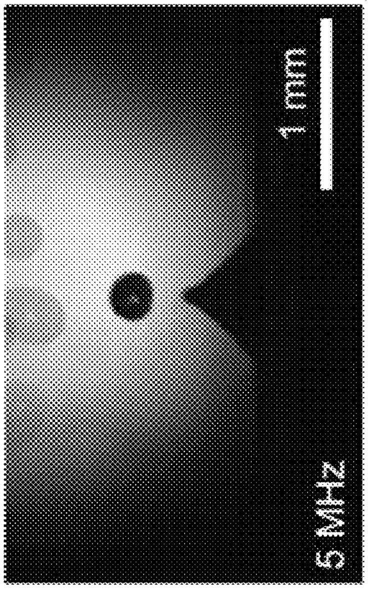
FIGS. 8A-8C illustrate acoustic ejection printing at different transducer frequencies in accordance with an embodiment of the invention.
Figure 8B:
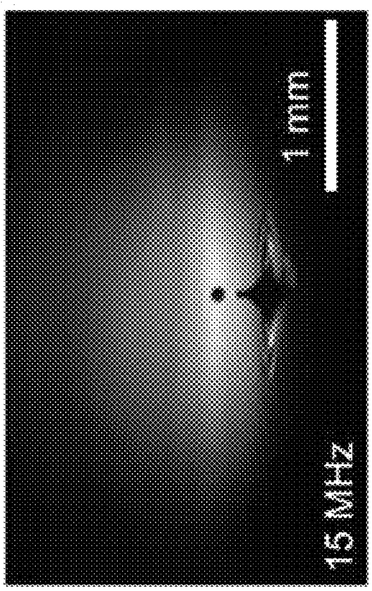
Figure 8C:
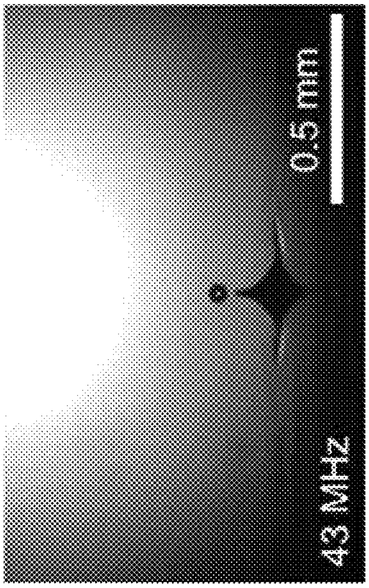

In many embodiments, transducer frequencies of acoustic inkjet printers can be tuned to produce different sizes of microdroplets. The size and the directionality of the ejected microdroplets can be determined by the acoustic wave frequency and energy. Certain embodiments show acoustic inkjet printing is able to eject a range of microdroplet sizes from around 15 μm to around 300 μm in diameter. In several embodiments, acoustic printers are able to eject microdroplets from around 25 μm to around 280 μm in diameter. A number of embodiments demonstrate that the higher transducer frequency, the smaller size of the microdroplets. Acoustic waves with high piezoelectric transducers (~100 to 200 MHz) can be utilized to form the appropriately sized microdroplets. Several embodiments are able to print microdroplet around 15 μm to 50 μm in diameter from a blood sample with transducer frequency around at 150 MHz. An example of acoustic ejection at different transducer frequencies is provided in FIGS. 8A-8C in accordance with an embodiment. FIGS. 8A-8C illustrate printing of microdroplets from a water/glycerin mixture with blood-equivalent viscosity. To generate these droplets, transducers frequencies are varied from around 5 MHz (FIG. 8A) to around 15 MHz (FIG. 8B) and around 43 MHz (FIG. 8C) to eject microdroplets in the size of 300 μm (FIG. 8A), 84 μm (FIG. 8B) and 44 μm (FIG. 8C), respectively.

Figure 9:
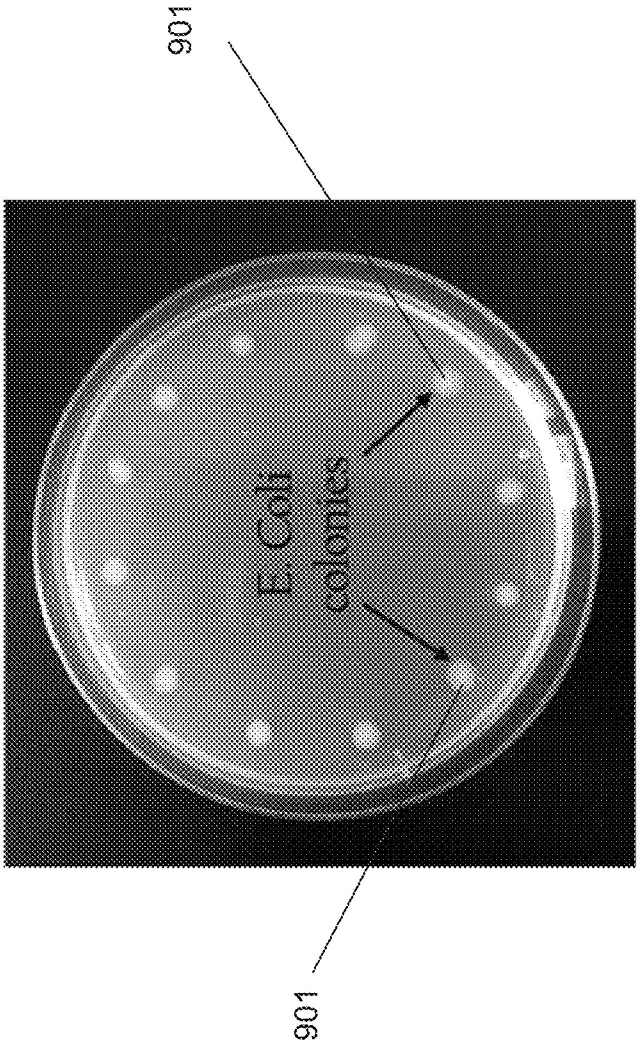
FIG. 9 illustrates bacterial colonies of *E. coli* growing from printed individual microdroplet on an agar plate in accordance with an embodiment of the invention.

Many embodiments study cellular viability of the ejected cells under different acoustic pressures. Certain embodiments include the number of ejected cells per microdroplet from different cellular stock solution concentrations and viscosities. Several embodiments optimize the printing parameters for cells of different sizes. A number of embodiments are able to perform acoustic ejection from a mixture of cells. Acoustic inkjet printing can provide great control of droplet size, printing location, and maintain viability in accordance with several embodiments. To further characterize the acoustic ejection of cells, several embodiments study acoustic ejection from *Saccharomyces cerevisiae* yeast cell stock solution. An example of acoustic ejection of *E. coli* printing on an agar plate is provided in FIG. 9 in accordance with an embodiment. The shown colonies (901) have grown from individual microdroplets deposited using the 15 MHz transducer at the designated locations. FIG. 9 shows both the controllability of generated droplet position and the viability of printed cells.

Figure 10A:
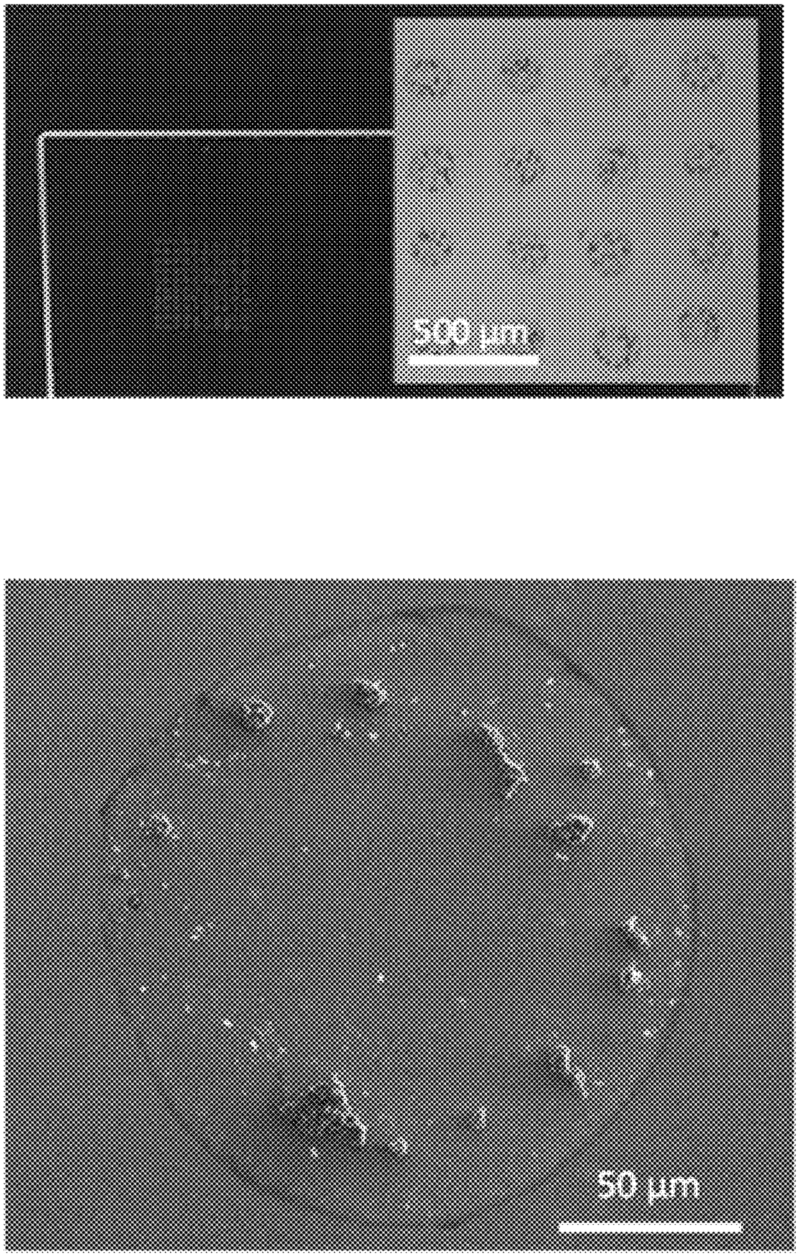
FIGS. 10A-10B illustrate acoustic ejection printing arrays of SERS-activated multicell microdroplets in accordance with an embodiment of the invention.
Figure 10B:
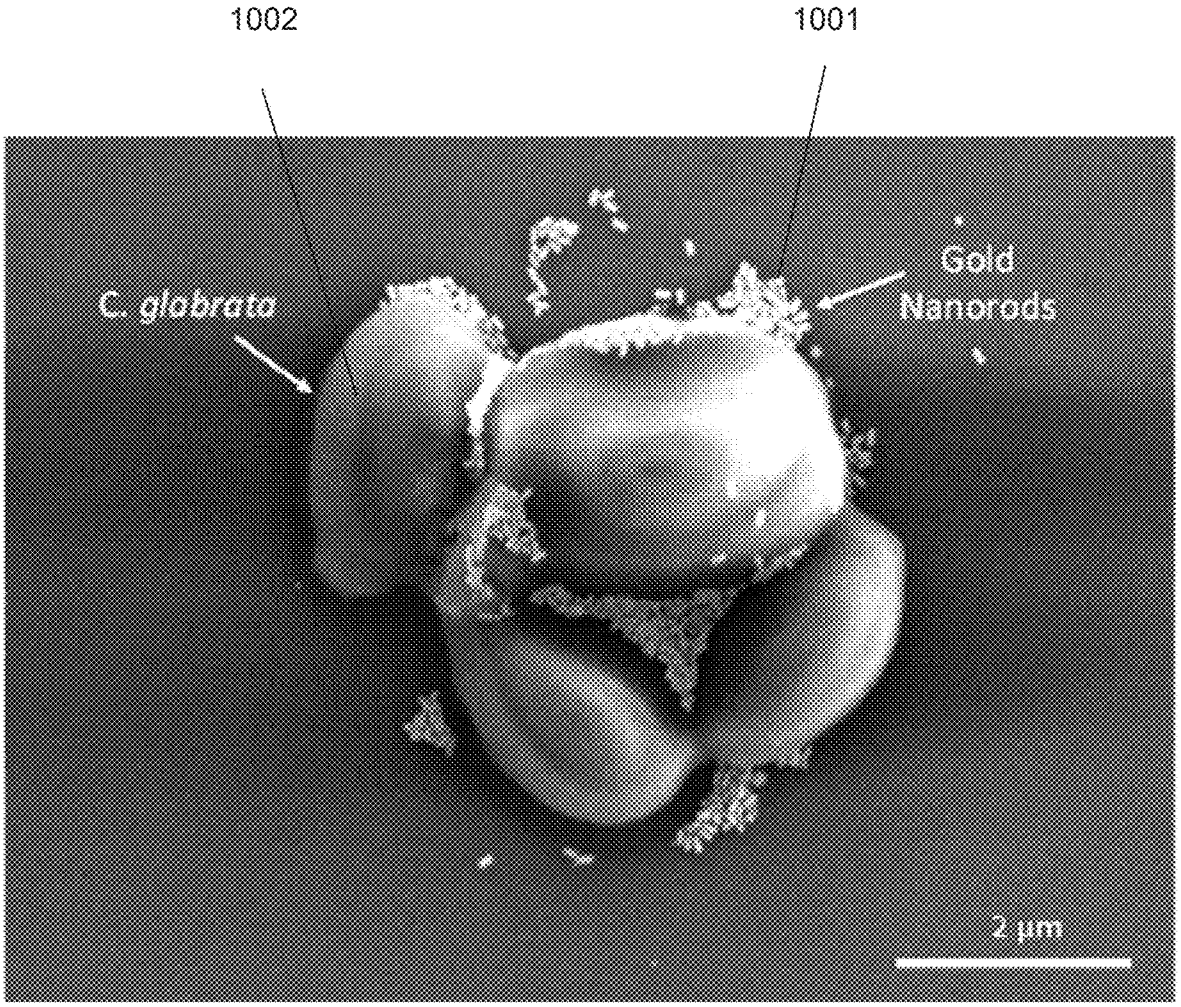

An example of arrays of SERS-activated multicell microdroplets printed with 45 MHz acoustic transducer is provided in FIGS. 10A-10B in accordance with an embodiment. FIG. 10A illustrates arrays of SERS-activated microdroplets printed with 45 MHz acoustic transducer on a substrate. FIG. 10B illustrates SERS-activated microdroplets printed with 45 MHz acoustic transducer containing gold nanorods (1001) and *C. glabrata* (1002).

Figure 11:
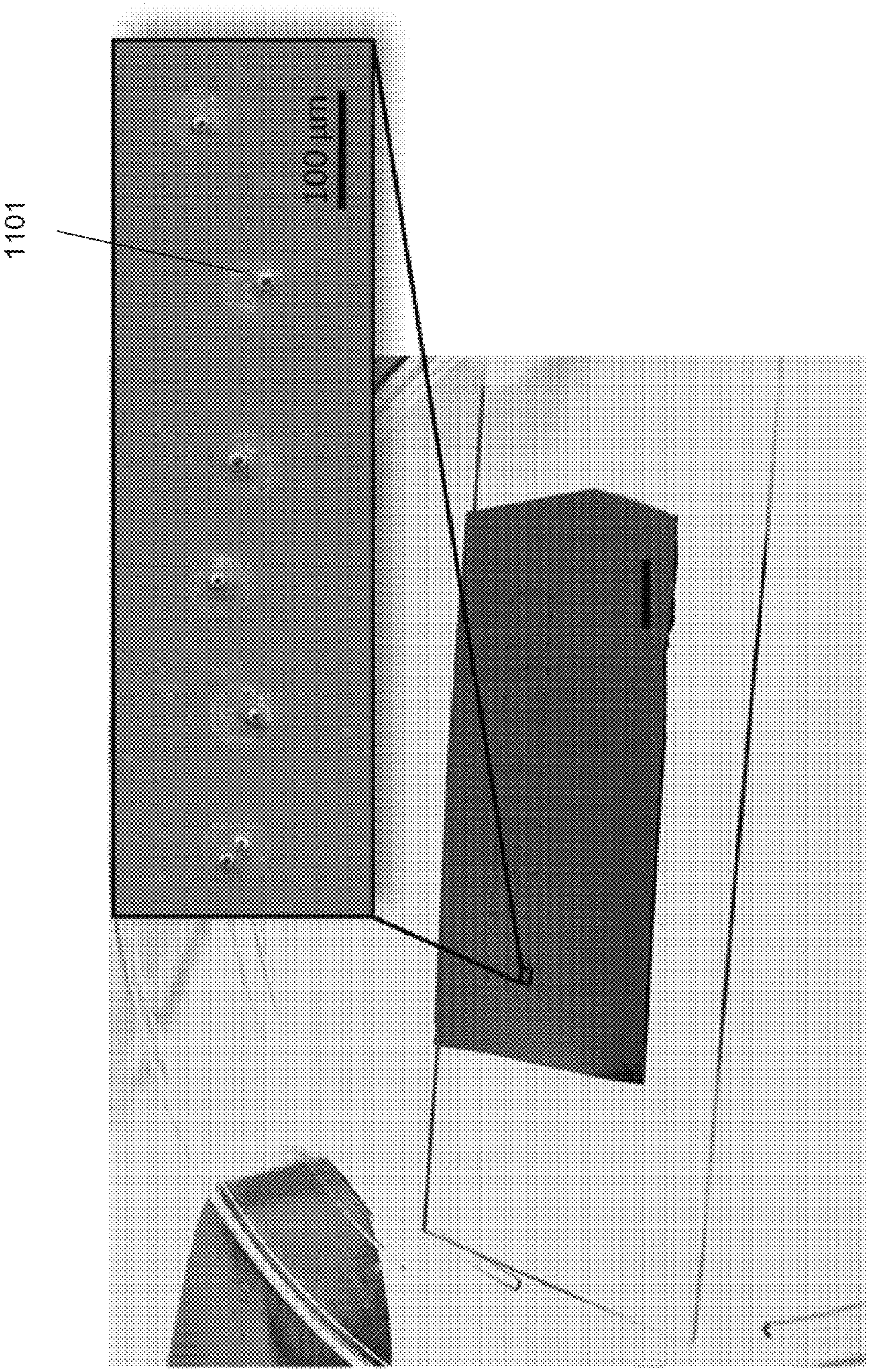
FIG. 11 illustrates acoustic ejection printing arrays of SERS-activated cellular microdroplets from whole blood in accordance with an embodiment of the invention.

An example of arrays of Raman-activated cellular microdroplets printed from whole blood using 45 MHz acoustic transducer is provided in FIG. 11 in accordance with an embodiment. 1101 illustrates red blood cells.

While specific examples of acoustic ejection of microdroplets are described in FIGS. 6-11, one of ordinary skill in the art can appreciate that various approaches of optimizing acoustic ejection process are possible according to some embodiments of the invention. Furthermore, any of a variety of process to optimize microdroplet printing appropriate to the requirements of a given application can be utilized in accordance with various embodiments of the invention. Processes for performing optical spectroscopy imaging in accordance with various embodiments of the invention are discussed further below.

Performing Optical Spectroscopy Imaging

Many embodiments utilize optical spectroscopies to scan and image microdroplets samples on a substrate. In several embodiments, optical spectra can include unique features of particles and can be used to identify particles. In some embodiments, Raman spectroscopy can be used to scan microdroplets on a substrate. Potential pathogens in microdroplets can be scanned by Raman spectroscopy to obtain their unique spectra in accordance with some embodiments.

For about a 1 mL patient sample, each printout may contain approximately 5 billion cells. If an imaging area of 1 $cm^2$ per frame, then about −11,000 spectral snapshots will be required. To keep the processing time within 30 minutes, each frame will be processed within about 1.5 s. Such high-speed acquisition is challenging with conventional confocal Raman scanners. Hence, many embodiments implement a wide-field hyperspectral Raman imaging system. Fast hyperspectral Raman imaging has been realized using Bragg tunable filters. Unlike tunable liquid crystal and acousto-optic filters, Bragg tunable filters may achieve high throughput with transmission efficiencies of about 80%. This scheme can be about 30 times faster than conventional Raman confocal imaging systems. Raman imaging with Bragg tunable filters can scan an area of about 130 μm by 130 μm with nearly diffraction-limited spatial resolution, less than about 8 $cm^{-1}$ spectral resolution, and a signal-to-noise ratio of about 25. Several embodiments incorporate Bragg tunable filters with SERS to achieve greater imaging efficiency. Several embodiments may use spatial resolution of about 10 μm by 10 μm to resolve individual cell positions. In some embodiments, interrogation times can be less than 1.5 s per 1 $cm^2$ combining high sensitivity of SERS imaging and high classification accuracies with signal-to-noise ratio of about 4.

Figure 12:
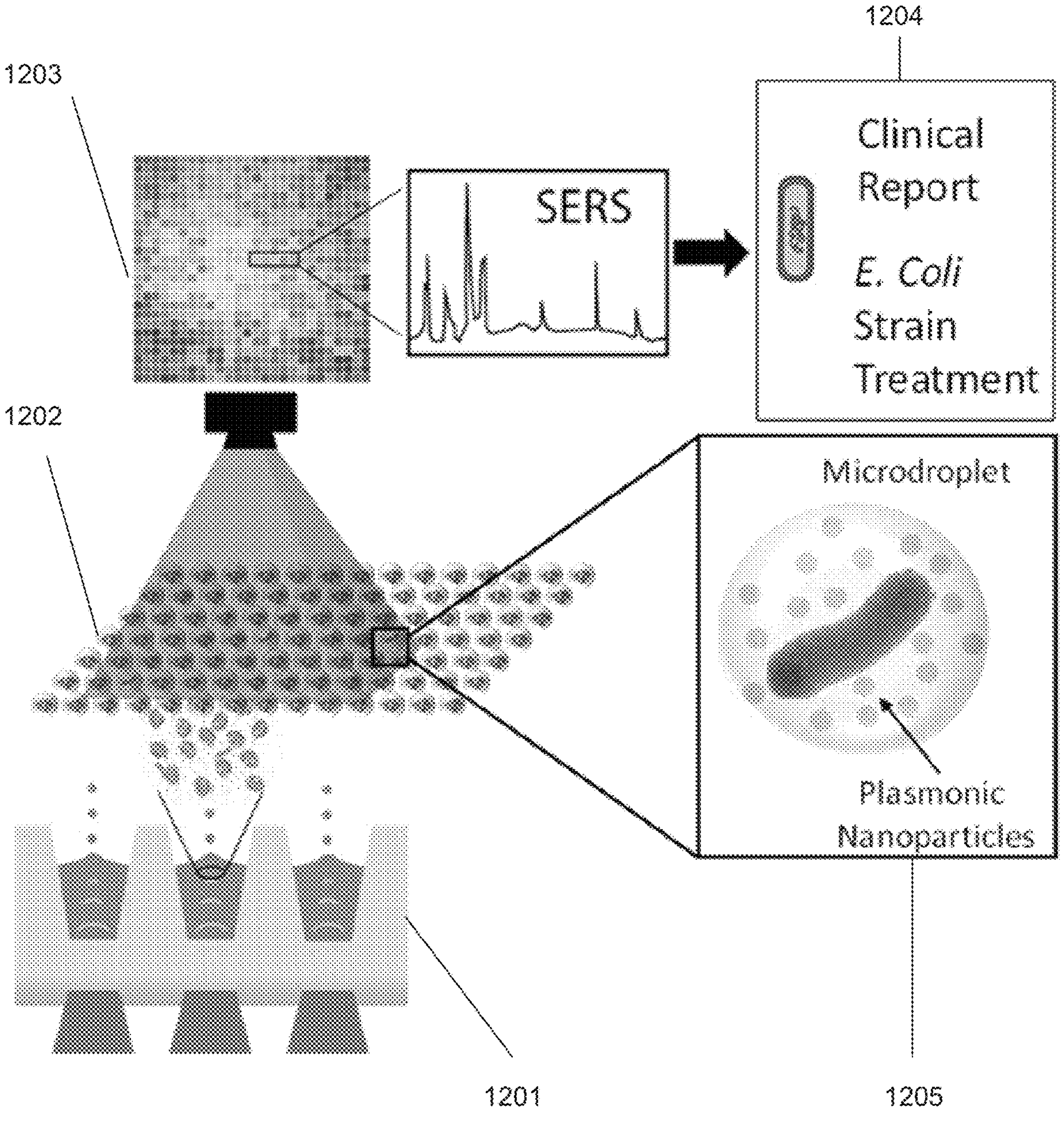
FIG. 12 illustrates a wide-field Raman detector platform in accordance with an embodiment of the invention.

An example of a wide-field hyperspectral Raman imaging system is illustrated in FIG. 12 in accordance with an embodiment. FIG. 12 illustrates a schematic of a wide-field Raman detector. Acoustic ejectors (1201) can print micro-droplets containing a single or a few cells onto a substrate. An array of microdroplets printed onto a 2-dimensional substrate (1202) can be imaged by a Raman spectroscopy. Each SERS-activated microdroplet (1205) includes plasmonic nanoparticles and a single or a few cells. Plasmonic nanoparticles can enhance SERS signals to achieve high sensitivity imaging. SERS spectra (1203) containing unique molecular signatures can be obtained for each microdroplet. The camera captures 2-dimensional (2D) images of the cellular printout with high-resolution spectral information encoded within each pixel. SERS spectra can be analyzed and molecular signatures can be used to identify pathogen including (but not limited to) bacteria strain, antibiotic susceptibility.

Several embodiments incorporate integral field spectroscopy (IFS) for wide-field spectroscopic imaging. In some embodiments, a 2D matrix of optical fibers (typically around 400-500 fibers) can be used to collect the image from an area and then arranged in a 1D array at the entrance-slit of a conventional spectrograph. Unlike the tunable filter where the spectral resolution is determined by the filter linewidth, optical-fiber IFS spectral resolution can be determined by the spectrograph. Consequently, very high spectral resolution can be obtained in accordance with certain embodiments.

In many embodiments, a wide-field Raman line scanner can image a 5 cm×5 cm area in one-tenth of the time compared to Renishaw™ inVia microscope. In some embodiments, the line-scanner can be used to image 2D arrays of microdroplets with known pathogen concentration and position. These measurements may determine the minimum pixel size (i.e., spacing between droplets), the maximum scanning speed and the optical illumination power to accurately identify the pathogen in accordance with a number of embodiments. Several embodiments determine the imaging conditions to maximize the sensitivity, accuracy, and speed of identification. Many embodiments utilize the optimized imaging conditions and implement both Bragg tunable filter and fiber-bundle IFS for wide-field Raman.

While specific examples of optical imaging system are described in FIG. 12, one of ordinary skill in the art can appreciate that various imaging systems of optimizing imaging quality are possible according to some embodiments of the invention. Furthermore, any of a variety of method to optimize optical imaging appropriate to the requirements of a given application can be utilized in accordance with various embodiments of the invention. Processes for processing optical spectra in accordance with various embodiments of the invention are discussed further below.

Processing Optical Spectra

In several embodiments, optical spectra with sample signatures can be obtained for identification. In some embodiments, Raman spectroscopy can be used to obtain a signature of biological samples printed on a substrate. Because of the unique molecular structure of a pathogen's cell membrane, each bacterial species has a specific Raman spectrum signature that can be used for identification. In several embodiments, SERS signatures of pathogens can convey information both about the pathogenic strain and its antibiotic susceptibility and/or resistance. In some embodiments, changes to SERS signatures upon antibiotic exposure can be used to monitor changes to cell membrane structure and cell viability, facilitating real-time antibiotic susceptibility testing.

A number of embodiments are directed towards generating a Raman signature for a sample and detecting a contaminant within the sample. In several embodiments, a Raman signature is generated for a biological sample. Biological samples include (but not limited to) blood, plasma, lymph, saliva, mucus, urine and stool. Contaminants to detect within a biological sample include (but not limited to) pathogens, circulating tumor cells, biomarkers. Pathogens include (but are not limited to) bacteria, viruses, fungi, algae, protozoa and other infections microorganisms.

Figure 13:
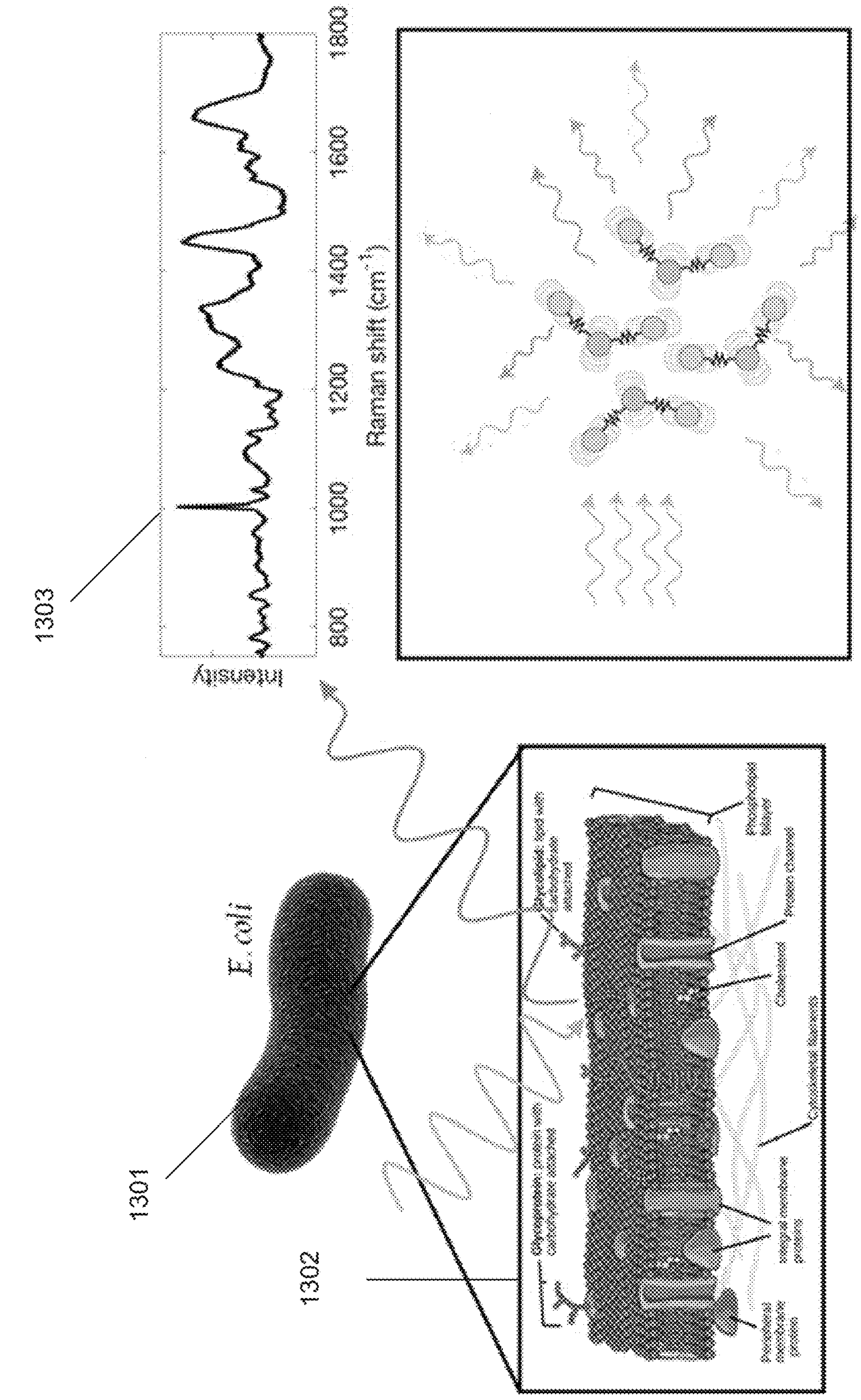
FIG. 13 illustrates an *E. coli* cell with unique molecular composition that can be detected by Raman spectroscopy in accordance with an embodiment of the invention.

An example of *E. coli* specific SERS signatures that can be used for identification is provided in FIG. 13 in accordance with an embodiment of the invention. In FIG. 13, 1301 illustrates an *E. coli* cell. 1302 illustrates *E. coli* cell membrane structures and molecular compositions that are unique to *E. coli*. 1303 illustrates a Raman spectrum that can be used to identify an *E. coli* cell.

Figure 14A:
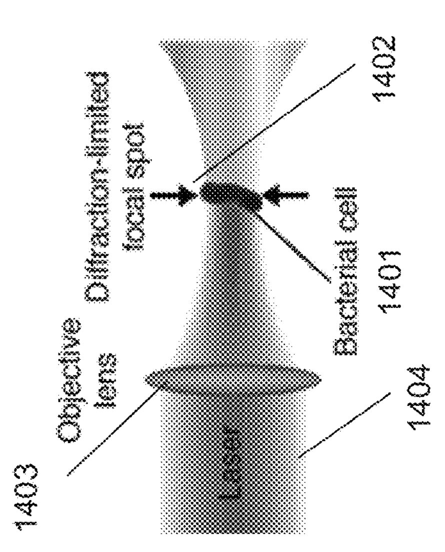
FIG. 14A illustrates a confocal Raman setup used for single cell Raman interrogation in accordance with an embodiment of the invention.
Figure 14B:
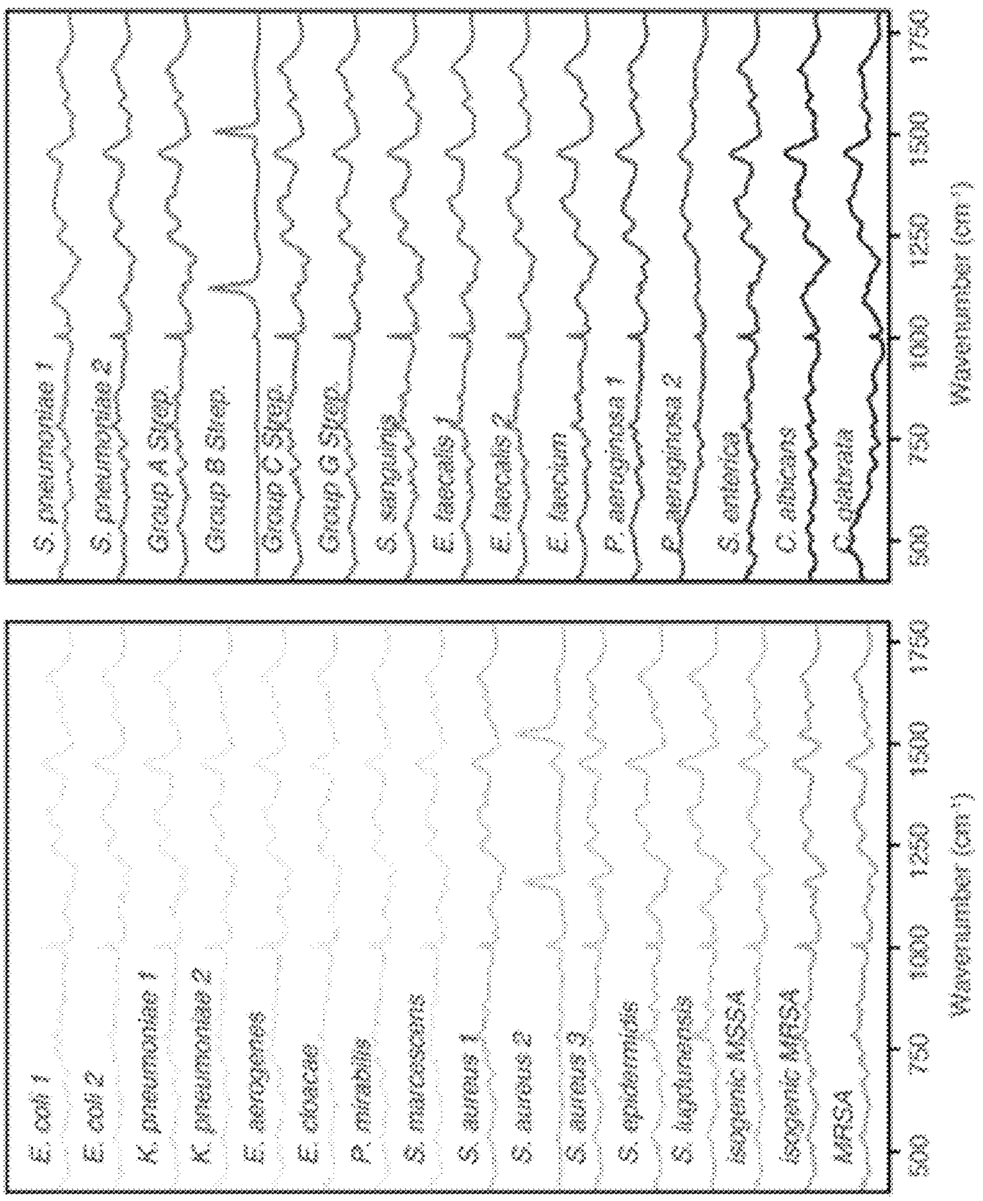
FIG. 14B illustrate Raman spectra of 30 bacterial species in accordance with an embodiment of the invention.

Many embodiments implement confocal spectroscopy to interrogate individual bacterial cells. Different bacterial phenotypes are characterized by unique molecular compositions, leading to subtle differences in their corresponding Raman spectra. An example of single cell Raman spectra of clinically relevant bacterial species is provided in FIGS. 14A-14B in accordance with an embodiment of the invention. Many embodiments test 31 cell lines coming from 22 species. A database of Raman spectra can be collected by spreading monolayers of bacteria onto gold coated microscope slides and measuring spectra using a confocal Raman microscope so that each spectrum comes from roughly a single cell that is in the focal spot of the laser. FIG. 14A illustrates a schematic of the confocal Raman setup used for single cell Raman interrogation. A single bacterial cell (1401) can be placed at the diffraction-limited focal spot (1402). A laser beam (1404) passes through an objective lens (1403) and focuses on the bacterial cell. The Raman spectrum can be recorded for the specific bacterial cell. FIG. 14B illustrates Raman spectra of 30 bacterial species with 1 s integration time with SNR of around 4.1. Spectra are color-grouped according to antibiotic treatment. Single cell bacterial spectra of 30 strains show unique features. As can be seen, some spectra signals are easier differentiated from others and some spectra signals can be similar. In some embodiments, only certain bands of spectra that are necessary to identify and/or differentiate contaminants in solution are imaged. By imaging a subset of spectra, the time required to image a substrate can be reduced. In addition, the time and effort to analyze the imaging result can be reduced.

For various implementations, only certain bands may be necessary to obtain a signature that can be identified and differentiated. In some instances, a machine learning model including (but not limited to) neural network, regression, SVM can be utilized to identify and/or differentiate signatures. Furthermore, in some instances, a machine learning model including (but not limited to) neural network, regression, SVM can be utilized to identify antibiotic susceptibility, which can used to treat an individual having a pathogenic infection.

In cases which spectra is easily differentiated, a clustering technique such as principal component analysis (PCA) is utilized to identify and differentiate spectra. In situations in which a simple clustering technique does not differentiate between the spectra, a machine learning model is trained to better differentiate the spectra. Machine learning models that can be utilized include neural networks, regression, and SVM. In some embodiments, a convolutional neural network (CNN) is utilized.

Some peaks from Raman spectra can be similar between different strains and different species. There are a few that look different, but the differences can be subtle. Many embodiments obtain high signal-to-noise ratios (SNRs) to reach high identification accuracies. Several embodiments train a convolutional neural network (CNN) to classify noisy bacterial spectra by isolate, empiric treatment, and antibiotic resistance. In some embodiments, CNN architecture includes 25 one-dimensional (1D) convolutional layers and residual connections—instead of two-dimensional images, it takes one-dimensional spectra as input. Several embodiments integrate CNN techniques from image classification to spectral data.

Figure 15:
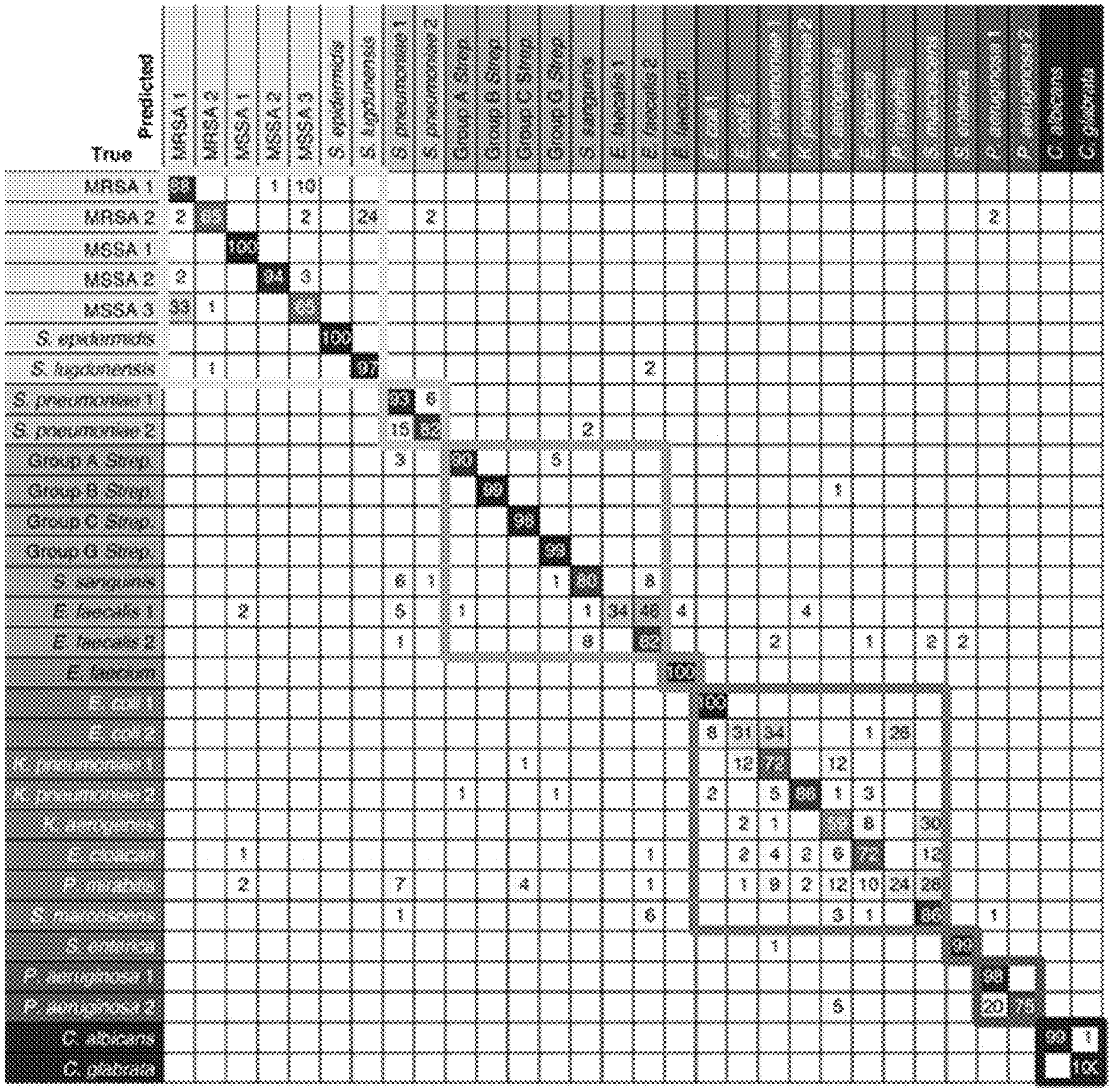
FIG. 15 illustrates performance breakdown for strain-level identification with neural networks in accordance with an embodiment of the invention.

In many embodiments, a machine learning model is trained to differentiate Raman spectra of bacteria strains. An example of a confusion network displaying the accuracy results of a trained CNN to differentiate between the Raman spectra of the 31 bacteria strains is provided in FIG. 15 in accordance with an embodiment. The average strain-level accuracy is at least 82.4%. Logistic regression and SVM machine learning models provided similar yet less accurate results at 75.7% and 74.9% accuracy, respectively. Most misclassifications were between strains and not between species. Also shown in FIG. 15 are boxes that group strains based on the antibiotic that would be most beneficially administered. As can be seen, most misclassification still would be administered the same antibiotic.

Figure 16:
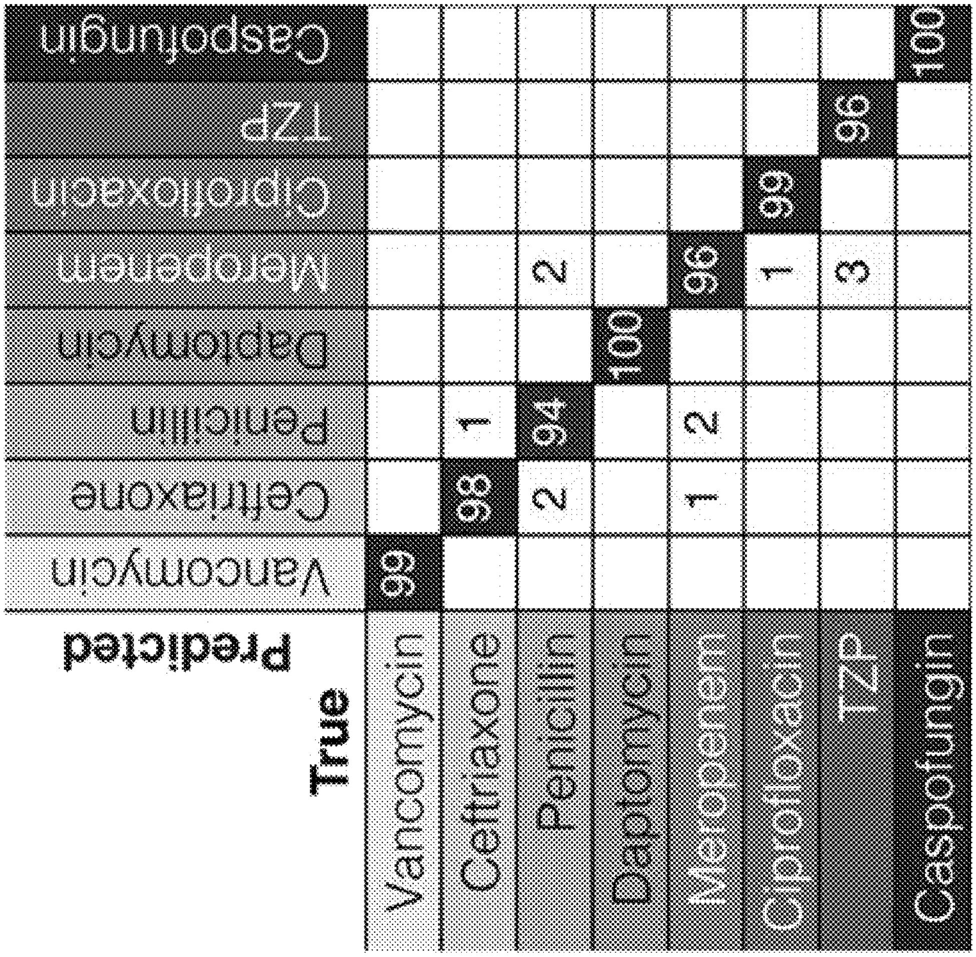
FIG. 16 illustrates the accuracy results of a trained convolutional neural network (CNN) to differentiate between Raman spectra based on antibiotic susceptibility in accordance with an embodiment of the invention.

In many embodiments, a machine learning model is trained to differentiate Raman spectra based on antibiotic susceptibility. An example of a confusion network displaying the accuracy results of a trained CNN to differentiate between Raman spectra based on antibiotic susceptibility is provided in FIG. 16 in accordance with an embodiment. The average antibiotic-susceptibility accuracy is at least 97.0%. Logistic regression and SVM machine learning models provide similar yet less accurate results at 93.3% and 92.2% accuracy, respectively.

Figure 17:
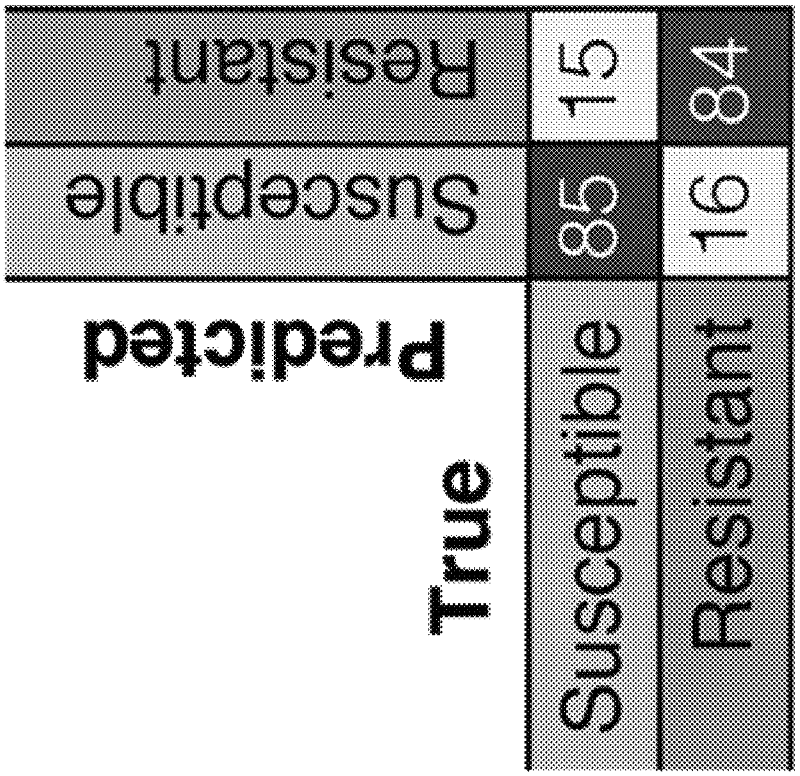
FIG. 17 illustrates the accuracy results of a trained CNN to differentiate between Raman spectra of methicillin-resistant *S. aureus* (MRSA) and methicillin-susceptible *S. aureus* (MSSA) in accordance with an embodiment of the invention.

Many embodiments implement culture-free detection of antibiotic resistance. In several embodiments, combined Raman-CNN system are able to combine bacterial detection, identification, and antibiotic susceptibility testing in a single step with single-cell sensitivity. In many embodiments, a machine learning model is trained to differentiate Raman spectra between antibiotic resistant and antibiotic susceptible bacteria strains of a single species. An example of a confusion network displaying the accuracy results of a trained CNN to differentiate between Raman spectra of methicillin-resistant *S. aureus* (MRSA) and methicillin-susceptible *S. aureus* (MSSA) is provided in FIG. 17 in accordance with an embodiment. The model achieves at least 89.1% identification accuracy.

Various embodiments of machine learning models can be altered as necessary to the application. The sensitivity and specificity of a model can be altered, which may be beneficial in various applications. For example, it may be beneficial to have higher sensitivity to detect an antibiotic resistant strain of bacteria at the expense of specificity.

Numerous embodiments are also directed to utilizing trained models with Raman spectra imaged from a biological sample of an individual. Accordingly, various embodiments utilize a biological sample to generate Raman spectra, and if a contaminant is within the biological sample, it can be detected and/or differentiated. In many embodiments, a biological sample's Raman spectra is utilized in trained model as described herein, including models to detect and differentiate bacteria strains, antibiotic susceptibility and binary models to differentiate MRSA from MSSA. It should be understood that any appropriate trained model can be utilized to detect and/or different contaminants in a biological sample extracted from an individual. Based on detection of a contaminant or treatment-susceptibility in Raman spectra derived from a biological sample as determined by a trained model, a treatment may be administered accordingly.

As bacteria strains evolve and/or differentiate based on environmental factors, seasons, locality, patient population, or other factors, trained models can be continued to be trained utilizing incoming Raman spectra data provided by biological samples of individuals. Models can be continually updated and improved with each sample.

Figure 18A:
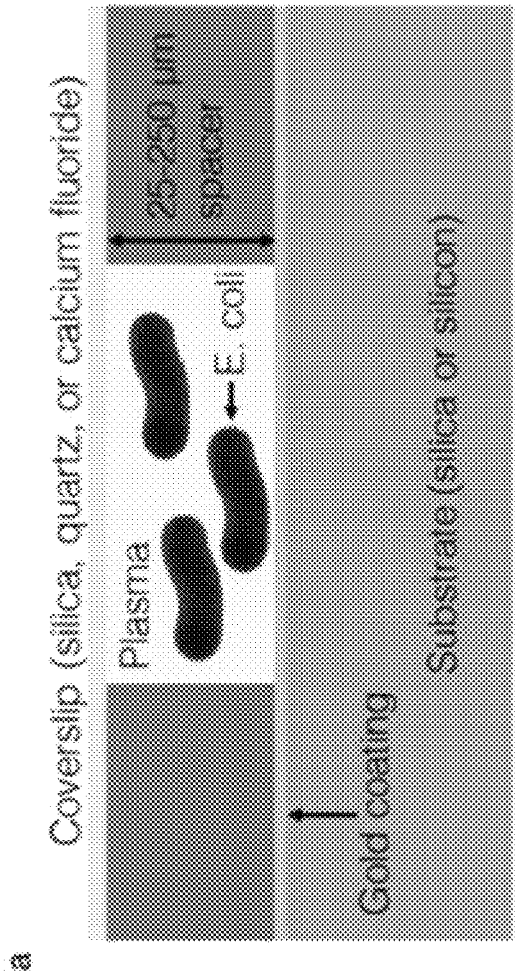
FIG. 18A illustrates a liquid chamber for Raman measurements in serum and/or plasma in accordance with an embodiment of the invention.
Figure 18B:
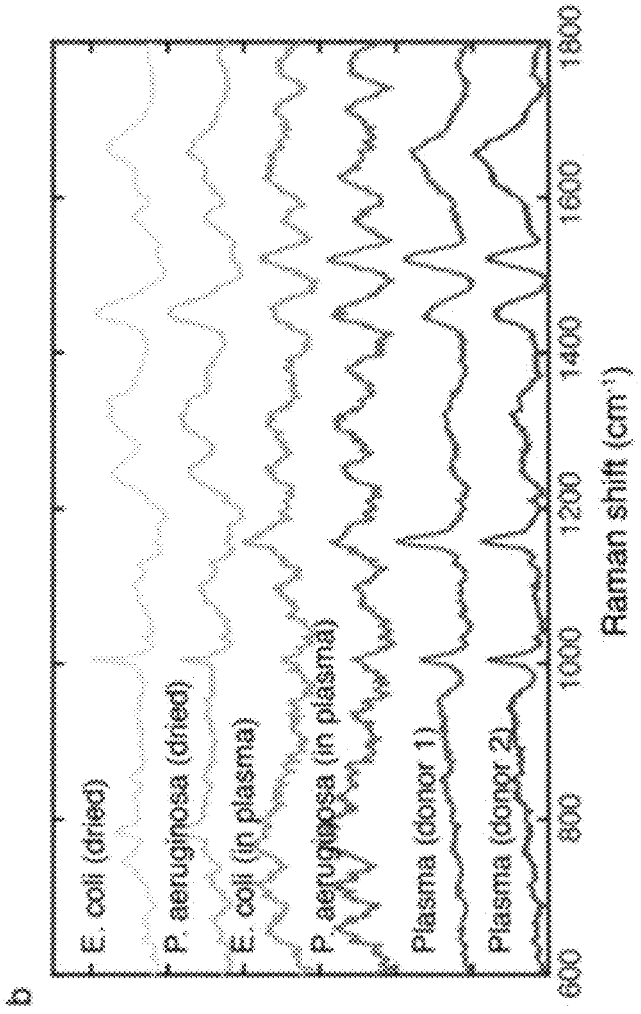
FIG. 18B illustrates Raman signals from *E. coli* and *P. aeruginosa* in plasma with comparisons to dried samples in accordance with an embodiment of the invention.

In many embodiments, combined Raman-CNN approach can be applied to AST and MIC classification tasks. Raman signatures from bacterial isolates that are co-cultured with different concentrations of antibiotics can be collected in accordance with some embodiments. Some embodiments focus on dried bacterial isolates that have been pre-cultured with antibiotics. In several embodiments, CNNs can differentiate between bacterial strains with different antibiotic susceptibilities and MICs. A number of embodiments implement a liquid chamber for Raman collection of single bacterial cells in liquid, including serum and plasma. Some embodiments show that bacterial spike-ins to plasma yield similar spectra to the ones from dried samples. Several embodiments indicate that differences between pathogenic species in plasma can be greater than differences between plasma donors. An example of liquid chamber for Raman spectroscopy is illustrated in FIGS. 18A-18B in accordance with an embodiment. FIG. 18A illustrates a schematic of liquid chamber for Raman measurements in serum and/or plasma. FIG. 18B shows Raman signals from *E. coli* and *P. aeruginosa* in plasma with comparisons to dried samples, as well as comparison between Raman signal of plasma from two different representative donors.

In many embodiments, neural networks that extract salient features of the spectra and their changes with increasing antibiotic exposure are developed. A binary classifier for each co-culture can determine if the antibiotic concentration is effective or ineffective, based on whether the pathogen is alive or dead in accordance with some embodiments. Several embodiments indicate that Raman spectra may provide information on antibiotic susceptibility and MIC without in vitro antibiotic exposure. Certain embodiments enable MIC results within seconds to minutes of a positive blood culture.

Several embodiments investigate to obtain MIC without in vitro antibiotic exposure. Some embodiments classify Raman spectra of bacteria alone by their susceptibility profiles, first in a binary resistant/susceptible and subsequently in a multi-class format to determine the MIC. Since the possible antibiotic choices and concentrations span a wide range, traditional classification schemes become unwieldy, due to the large number of classes required. Many embodiments implement a multi-task learning for both the binary and multi-class formats. Designing one CNN to perform the multiple tasks of susceptibility testing for each antibiotic in parallel would enable the full antibiotic susceptibility profile for multiple antibiotics at once, all from a single Raman measurement.

Applications and Treatments

Various embodiments are directed to performing a treatment based on detecting a pathogen in a biological sample. As described herein, pathogens can be detected in a biological sample utilizing Raman spectroscopy. Based on a detected pathogen, an individual can be treated with an antibiotic. In some embodiments, antibiotic susceptibility is determined utilizing Raman spectroscopy (with or without determining the precise pathogen) and thus an individual is treated with the determined antibiotic.

A number of antibiotics can be administered, as appropriate for the detected pathogen or antibiotic susceptibility. Antibiotics include (but not limited to) vancomycin, ceftriaxone, penicillin, daptomycin, meropenem, ciprofloxacin, piperacillin-tazobactam (TZP), and caspofungin.

DOCTRINE OF EQUIVALENTS

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method to identify particle in a sample, comprising:

obtaining a sample, wherein the sample comprises a plurality of cells or a plurality of molecules;

mixing the sample with a solution, wherein the solution comprises non-binding metallic plasmonic nanoparticles;

printing the mixed sample solution into microdroplets onto a substrate with a printer, wherein each of the microdroplets comprises a single cell or a single molecule and a homogeneous dispersion of the non-binding metallic plasmonic nanoparticles;

imaging the substrate with an optical spectroscopy;

analyzing an optical spectrum and identifying particle specific features from the optical spectrum.

2. The method of claim 1, wherein the sample is an environmental sample from a source and the source is a water source, waste water, food or soil.

3. The method of claim 1, wherein the sample is a biological sample extracted from an individual and the biological sample is blood, plasma, lymph, saliva, mucus, sweat, urine, stool or cellular solution.

4. The method of claim 2, wherein the particle in a sample is a bacteria pesticide, antibiotic or microplastic.

5. The method of claim 3, wherein the particle in a sample is a pathogen and the pathogen is a bacterium, virus, fungus, microorganism, yeast, circulating tumor cell, exosome, extracellular vesicle or biomarker.

6. The method of claim 1, wherein the solution comprises gold plasmonic nanoparticle.

7. The method of claim 1, wherein the plasmonic nanoparticle has a shape selected from the group consisting of nanoshell, nanoflower, nanorod and nanostar.

8. The method of claim 1, wherein the microdroplets are between 15 microns and 300 microns in diameter.

9. The method of claim 8, wherein the microdroplets are between 25 microns and 280 microns in diameter.

10. The method of claim 8, wherein the microdroplets are between 15 microns and 50 microns in diameter.

11. The method of claim 1, wherein the printer is an inkjet printer or an acoustic inkjet printer.

12. The method of claim 11, wherein the acoustic inkjet printer is a micro-electro-mechanical acoustic inkjet printer.

13. The method of claim 11, wherein the acoustic inkjet printer has a transducer and the transducer has frequency between around 100 MHz and around 200 MHz.

14. The method of claim 13, wherein the transducer frequency is around 5 MHz, around 15 MHz or around 45 MHz.

15. The method of claim 1, wherein the optical spectroscopy is a Raman spectroscopy.

16. The method of claim 15, wherein the Raman spectroscopy is a surface enhanced Raman spectroscopy.

17. The method of claim 15, wherein the Raman spectroscopy comprises Bragg tunable filters.

18. The method of claim 1, wherein the features from an optical spectrum identifies a cell type, a bacterium strain, or a biomolecule.

* * * * *